United States Patent
Hou et al.

(10) Patent No.: US 7,767,112 B2
(45) Date of Patent: *Aug. 3, 2010

(54) METHOD FOR INDUCING OR ENHANCING THE THRESHOLD VOLTAGE OF AN ELECTROPHORETIC DISPLAY

(75) Inventors: Jack Hou, Fremont, CA (US); HongMei Zang, Sunnyvale, CA (US); Yajuan Chen, San Jose, CA (US); Jing-Den Chen, Milpitas, CA (US); Chih-Yuan Liao, Saratoga, CA (US); Rong-Chang Liang, Cupertino, CA (US)

(73) Assignee: SiPix Imaging, Inc., Fremont, CA (US)

( * ) Notice: Subject to any disclaimer, the term of this patent is extended or adjusted under 35 U.S.C. 154(b) by 771 days.

This patent is subject to a terminal disclaimer.

(21) Appl. No.: 11/734,170

(22) Filed: Apr. 11, 2007

(65) Prior Publication Data
US 2007/0187654 A1    Aug. 16, 2007

Related U.S. Application Data

(62) Division of application No. 10/683,869, filed on Oct. 9, 2003, now Pat. No. 7,226,550.

(60) Provisional application No. 60/417,762, filed on Oct. 10, 2002.

(51) Int. Cl.
*H01B 1/00* (2006.01)
*G02B 26/00* (2006.01)
(52) U.S. Cl. .................. 252/500; 359/296
(58) Field of Classification Search .............. 252/500; 359/296
See application file for complete search history.

(56) References Cited

U.S. PATENT DOCUMENTS

| | | | |
|---|---|---|---|
| 3,006,921 A | 10/1961 | Weinmayr |
| 3,281,426 A | 10/1966 | Van Dyke Tiers |
| 3,612,758 A | 10/1971 | Evans et al. |
| 3,870,517 A | 3/1975 | Ota et al. |
| 4,059,451 A | 11/1977 | Oita et al. |
| 4,077,936 A | 3/1978 | Tanaka et al. |
| 4,085,137 A | 4/1978 | Mitsch et al. |

(Continued)

FOREIGN PATENT DOCUMENTS

GB    1 492 983    11/1977

(Continued)

OTHER PUBLICATIONS

Allen, K. (Oct. 2003). Electrophoretics Fulfilled. *Emerging Displays Review: Emerging Display Technologies, Monthly Report*—Oct. 9-14, 2003.

(Continued)

*Primary Examiner*—Mark Kopec
*Assistant Examiner*—Jaison P Thomas
(74) *Attorney, Agent, or Firm*—Howrey LLP

(57) ABSTRACT

This invention relates to electrophoretic displays having improved performance. The invention also relates to a method for inducing or enhancing the threshold voltage of an electrophoretic display, which method comprises adding a threshold promoter into an electrophoretic fluid which comprises charged pigment particles or pigment-containing microparticles dispersed in a dielectric solvent or solvent mixture.

25 Claims, 9 Drawing Sheets

U.S. PATENT DOCUMENTS

| | | | |
|---|---|---|---|
| 4,093,534 | A | 6/1978 | Carter et al. |
| 4,094,911 | A | 6/1978 | Mitsch et al. |
| 4,285,801 | A | 8/1981 | Chiang |
| 4,620,916 | A | 11/1986 | Zwemer et al. |
| 4,655,897 | A | 4/1987 | DiSanto et al. |
| 4,772,103 | A | 9/1988 | Saxe |
| 5,177,476 | A | 1/1993 | DiSanto et al. |
| 5,260,435 | A | 11/1993 | Sawada et al. |
| 5,378,589 | A | 1/1995 | Sawada et al. |
| 5,460,688 | A | 10/1995 | DiSanto et al. |
| 5,573,711 | A | 11/1996 | Hou et al. |
| 5,930,026 | A | 7/1999 | Jacobson et al. |
| 5,961,804 | A | 10/1999 | Jacobson et al. |
| 6,084,057 | A | 7/2000 | Gibbons et al. |
| 6,162,521 | A | 12/2000 | Falcone |
| 6,187,954 | B1 | 2/2001 | Falcone |
| 6,239,896 | B1 | 5/2001 | Ikeda |
| 6,262,833 | B1 | 7/2001 | Loxley et al. |
| 6,549,327 | B2 | 4/2003 | Foucher et al. |
| 6,650,463 | B2 | 11/2003 | Obikawa et al. |
| 6,672,921 | B1 | 1/2004 | Liang et al. |
| 6,693,620 | B1 | 2/2004 | Herb et al. |
| 6,751,007 | B2 * | 6/2004 | Liang et al. ............... 359/296 |
| 6,781,745 | B2 | 8/2004 | Chung et al. |
| 6,806,995 | B2 | 10/2004 | Chung et al. |
| 6,822,782 | B2 | 11/2004 | Honeyman et al. |
| 6,930,818 | B1 | 8/2005 | Liang et al. |
| 6,933,098 | B2 | 8/2005 | Chan-Park et al. |
| 7,052,766 | B2 | 5/2006 | Zang et al. |
| 7,110,162 | B2 | 9/2006 | Wu et al. |
| 7,303,818 | B2 * | 12/2007 | Minami ............... 428/402 |
| 2002/0131152 | A1 | 9/2002 | Liang et al. |
| 2004/0030125 | A1 | 2/2004 | Li et al. |
| 2004/0201567 | A1 | 10/2004 | Yu et al. |
| 2005/0039274 | A1 | 2/2005 | Yang et al. |
| 2005/0136347 | A1 | 6/2005 | Gu et al. |
| 2005/0227155 | A1 | 10/2005 | Minami |
| 2005/0264868 | A1 | 12/2005 | Hwang et al. |

FOREIGN PATENT DOCUMENTS

| | | |
|---|---|---|
| WO | WO 02/01281 | 1/2002 |
| WO | WO 02/065215 | 8/2002 |
| WO | WO 03/023510 | 3/2003 |
| WO | WO 03/038512 | 5/2003 |
| WO | WO 03/057360 | 7/2003 |
| WO | WO 03/058335 | 7/2003 |
| WO | WO 03/069403 | 8/2003 |
| WO | WO 2004/068234 | 8/2004 |

OTHER PUBLICATIONS

Bardsley, J.N. & Pinnel, M.R. (Nov. 2004) Microcup™ Electrophoretic Displays. *USDC Flexible Display Report*, 3.1.2. pp. 3-12-3-16.

Caporiccio, et al. (1983) Low Temperature Elastomeric Polyamides Containing Perfluorinated Polyether Building Blocks. *Makromol. Chem.* 184, pp. 935.

Chen, S.M. (Jul. 2003) The Applications for the Revolutionary Electronic Paper Technology. *OPTO News & Letters*, 102, 37-41. (in Chinese, English abstract attached).

Chen, S.M. (May 2003) The New Applications and the Dynamics of Companies. *TRI.* 1-10. (In Chinese, English abstract attached).

Dalisa, A.L. (Jul. 1977) Electrophoretic Display Technology. *IEEE Trans. Dev.*, pp. 827.

Diamond, A.S. editor. (2002) *Handbook of Imaging Materials*. Marcel Dekker. (2001 version not available).

Green, F.J. (1990) *The Signma-Aldrich Handbook of Stains, Dyes and Indicators*. Aldrich Chemical Co.

Gregory, P. Et al (1991) *High Technology Applications of Organic Colorants*. Plenum Publishing Corp.

Ho, Andrew. (Nov. 2006) *Embedding e-Paper in Smart Cards, Princing Labels & Indicators*. Presentation conducted at Smart Paper Conference Nov. 15-16, 2006, Atlanta, GA.

Ho, Candice. (Feb. 1, 2005) *Microcupt® Electronic Paper Device and Application*. Presentation conducted at USDC 4th Flexible Display Conference 2005.

Hopper and V. Novotny, An Electrophoretic Display, Its Properties, Model, and Addressing. *IEEE Trans. Electr. Dev.*, 26(8):1148-1152, (1979).

Lee, H., & Liang, R.C. (Jun. 2003) SiPix Microcup(R) Electronic Paper—An Introduction. *Advanced Display*, Issue 37, 4-9 (in Chinese, English abstract attached).

Liang, R.C. (Feb. 2003) *Microcup(R) Electrophoretic and Liquid Crystal Displays by Roll-to-Roll Manufacturing Processes*. Presentation conducted at the Flexible Microelectronics & Displays Conference of U.S. Display Consortium, Phoenix, Arizona, USA.

Liang, R.C., & Tseng, S. (Feb. 2003). *Microcup(R) LCD, An New Type of Dispersed LCD by A Roll-to-Roll Manufacturing Process*. Paper presented at the IDMC, Taipei, Taiwan.

Liang, R.C., (Feb. 2005) *Flexible and Roll-able Displays/Electronic Paper—A Brief Technology Overview*. Flexible Display Forum, 2005, Taiwan.

Liang, R.C., Hou, J., & Zang, H.M. (Dec. 2002) Microcup Electrophoretic Displays by Roll-to-Roll Manufacturing Processes. *IDW*, EP2-2, 1337-1340.

Liang, R.C., Hou, J., Chung, J., Wang, X., Pereira, C., & Chen, Y. (2003). Microcup(R) Active and Passive Matrix Electrophoretic Displays by A Roll-to-Roll Manufacturing Processes. *SID Digest*, 20.1.

Liang, R.C., Hou, J., Zang, H.M., & Chung, J. (Feb. 2003). *Passive Matrix Microcup(R) Electrophoretic Displays*. Paper presented at the IDMC, Taipei, Taiwan.

Liang, R.C., Hou, J., Zang, H.M., Chung, J., & Tseng, S. (2003). Microcup(R) displays : Electronic Paper by Roll-to-Roll Manufacturing Processes. *Journal of the SID*, 11(4), 621-628.

Malik, et al, (1991) Synthesis of Fluorinated Diisocyanates. *J. Org. Chem.* 56, pp. 3043.

Mashlyakovskiy, Leonid, et al. (1999) Fluoropolyethers End-Capped by Polar Functional Groups. I. Kinetic Approach to the Reaction of hydroxy-Terminated Fluoropolyethers with Cycloalyphatic and Aromatic Diisocyanates. *Journal of Polymer Science : Part A*. vol. 37, pp. 557.

Mashlyakovskiy, Leonid, et al. (1999) Fluoropolyethers End-Capped by Polar Functional Groups. II. Effect of Catalyst and Reagents Concentration, Solvent Nature, and Temperature on Reaction Kinetics of α, ω-Bis(hydroxy)-Terminated Fluoropolyethers with Cycloalyphatic and Aromatic Diisocyanates. *Journal of Polymer Science : Part A*. vol. 37, pp. 2579.

Mashlyakovskiy, Leonid, et al. (2002) Fluoropolyethers End-Capped by Polar Functional Groups. III. Kinetics of the Reactions of Hydroxy-Terminated Fluoropolyethers and Model Fluorinated Alcohols with Cyclohexyl Isocyanate Catalyzed by Organotin Compounds. *Journal of Polymer Science : Part A*. vol. 40, pp. 3771.

Mossman, M.A. et al (2001) New Reflective Display Based on Total Internal Reflection in Prismatic Microstructure. *SID IDRC Proceedings*, pp. 311.

Mossman, M.A., et al (2001) New Reflective Color Display Techniques Based on Total Internal Reflection and Subtractive Color Filtering. *SID 01 Digest*, pp. 1054, (2001).

Mossman, M.A., et al. (2002) Grey Scale Control of TIR Using Electrophoresis of Sub-Optical Pigment Particles, *SID 02 Digest*, pp. 522.

Nikkei Microdevices. (Dec. 2002) Newly-Developed Color Electronic Paper Promises—Unbeatable Production Efficiency. *Nikkei Microdevices*, 3. (in Japanese, with English translation).

Ota, et al (1977) Developments in Electrophoretic Displays. *SID Proceeding*, 18, pp. 243.

Richmon, J.M. editor. (1990) *Cationic Surfactants: Organic Chemistry*. Surfactant Science Series vol. 34, Marcel Dekker.

Tonelli, et al. (2002) Perfluoropolyether Functional Oligomers: Unusual Reactivity in Organic Chemistry. *J. Fluorine Chemistry*. 118, pp. 107.

Wang, X., Li, P., Sodhi, D., Xu, T. and Bruner, S. et al., (Feb. 2006) *Inkjet Fabrication of Multi-Color Microcup® Electrophorectic Display*. the Flexible Microelectronics & Displays Conference of U.S. Display Consortium.

Wang, X., Zang, HM., and Li, P. (Jun. 2006) Roll-to-Roll Manufacturing Process for Full Color Electrophoretic film. *SID Digest*, 00, pp. 1587-1589.

Zang, H.M. & Hou, Jack, (Feb. 2005) *Flexible Microcup® EPD by RTR Process*. Presentation conducted at $2^{nd}$ Annual Paper-Like Displays Conference, Feb. 9-11, 2005, St. Pete Beach, Florida.

Zang, H.M., & Liang, R.C. (2003) Microcup Electronic Paper by Roll-to-Roll Manufacturing Processes. *The Spectrum*, 16(2), 16-21.

Zang, HM., (Feb. 2007) *Developms in Microcup® Flexible Displays*. Presentaiton conducted at the 6th Annual Flexible Display and Microelectronics Conference, Phoenix, AZ Feb. 6-8.

Zang, HM., Wang, W., Sun, C., Gu, H., and Chen, Y. (May 2006) Monochrome and Area Color Microcup® EPDs by Roll-to-Roll Manufacturing Processes. *ICIS '06 International Congress of Imaging Science Final Program and Proceedings*, pp. 362-365.

* cited by examiner

METHOD FOR INDUCING OR ENHANCING THE THRESHOLD VOLTAGE OF AN ELECTROPHORETIC DISPLAY

This application is a divisional application of U.S. application Ser. No. 10/683,869, filed Oct. 9, 2003 now U.S. Pat. No. 7,226,550; which claims the priority under 35 USC 119 (e) of U.S. Provisional Applications No. 60/417,762 now U.S. Pat. No. 7,226,550, filed Oct. 10, 2002. The contents of both applications are incorporated herein by references in their entirety.

BACKGROUND OF THE INVENTION

1. Field of the Invention

This invention relates to electrophoretic displays having improved performance.

2. Brief Description of Related Art

The electrophoretic display (EPD) is a non-emissive device based on the electrophoresis phenomenon of charged pigment particles suspended in a dielectric solvent. It was first proposed in 1969. The display usually comprises two plates with electrodes placed opposing each other and separated by spacers. One of the electrodes is usually transparent. A suspension composed of a colored solvent and charged pigment particles is enclosed between the two plates. When a voltage difference is imposed between the two electrodes, the pigment particles migrate to one side and then either the color of the pigment or the color of the solvent can be seen according to the polarity of the voltage difference.

There are several different types of EPDs. In the partition type EPD (see M. A. Hopper and V. Novotny, IEEE Trans. Electr. Dev., 26(8):1148-1152 (1979)), there are partitions between the two electrodes for dividing the space into smaller cells in order to prevent undesired movement of particles such as sedimentation. The microcapsule type EPD (as described in U.S. Pat. Nos. 5,961,804 and 5,930,026) has a substantially two dimensional arrangement of microcapsules each having therein an electrophoretic composition of a dielectric solvent and a suspension of charged pigment particles that visually contrast with the dielectric solvent. Another type of EPD (see U.S. Pat. No. 3,612,758) has electrophoretic cells that are formed from parallel line reservoirs. The channel-like electrophoretic cells are covered with, and in electrical contact with, transparent conductors. A layer of transparent glass from which side the panel is viewed overlies the transparent conductors.

An improved EPD technology was disclosed in co-pending applications, U.S. Ser. No. 09/518,488 filed on Mar. 3, 2000 (corresponding to WO01/67170), U.S. Ser. No. 09/606,654 filed on Jun. 28, 2000 (corresponding to WO02/01280) and U.S. Ser. No. 09/784,972 filed on Feb. 15, 2001 (corresponding to WO02/65215). The improved EPD comprises closed cells formed from microcups of well-defined shape, size and aspect ratio and filled with charged pigment particles dispersed in a dielectric solvent.

As in liquid crystal and other displays, an EPD may be a segment display, a passive matrix display or an active matrix display, depending on the driving mechanism and the circuitry design. The passive matrix driving system is one of the most cost effective driving mechanisms. The system has row electrodes on the top side and column electrodes on the bottom side, of the cells. In most cases, the top row electrodes and the bottom column electrodes are perpendicular to each other. Generally speaking, a threshold voltage of no less than ⅓ of the driving voltage is required to suppress or eliminate the undesirable cross-bias or crosstalk effect in adjacent pixels of a passive matrix display.

Crosstalk occurs when the particles in a cell are biased by the electric field of a neighboring cell. FIG. 1 provides an example to illustrate crosstalk. A and B are two cells of a passive matrix EPD with a voltage bias of 30V and 0V, respectively. The bias voltage of the cell A drives the positively charged particles towards the bottom of the cell. Since cell B has no voltage bias, the positively charged particles in cell B are expected to remain at the top of the cell. However, if the two cells, A and B, are close to each other, the top electrode voltage of cell B (+30V) and the bottom electrode voltage of cell A (0V) create a crosstalk electric field which may force some of the particles in cell B to move downwards. Widening the distance between adjacent cells may eliminate such a problem; but the distance may also reduce the resolution of the display.

Alternatively, the crosstalk problem can be lessened if a cell has a significantly high threshold voltage. A large gamma (or a steep slope) of the response-voltage characteristic curve is also desirable to increase the resolution of a passive matrix device. However, cells in EPDs made using the electrophoretic materials and techniques currently available typically do not have the required response-voltage characteristics to prevent the undesirable movement of particles. As a result, the EPDs constructed from these materials and techniques usually cannot achieve high resolution.

Cross bias is another well-known problem associated with a passive matrix display. The voltage applied to a column electrode not only provides the driving bias for the cells in the scanning row, but it also affects the bias across the non-scanning cells in the same column. This undesired bias may force the particles of non-scanning cells to migrate to the opposite electrode. This undesirable particle migration causes visible optical density change and reduces the contrast ratio of the display.

In addition, in order to scan through all rows of electrodes in a frame within a reasonable time scale, a fast response rate is also highly desirable. However, most of the EPDs currently available have not shown an acceptable threshold characteristics or response rate required.

Electrophoretic fluids having inherent threshold characteristics have been reported by, for example, I. Ota, et al, in SID Proceedings, 18, 243 (1977) and Evans, et al, in U.S. Pat. No. 3,612,758. The fluids have reportedly shown disadvantages in response time, operation voltage, brightness, image uniformity or display longevity. In most cases, the fluid is in direct contact with the electrode conductor. The direct contact may enhance the particle-electrode interaction and, in some cases, result in a threshold, but with trade-offs in image uniformity and display longevity probably due to the irreversible adsorption and/or redox reaction(s) at the electrode surface.

A system having gating electrodes was disclosed in U.S. Pat. Nos. 4,655,897 and 5,177,476 (assigned to CopyTele, Inc.) to provide EPDs capable of high resolution at a relative high driving voltage using a two layer electrode structure, one of which layers serves as a gating electrode. Although these documents teach how the threshold voltage may be raised by the use of gating electrodes, the cost for fabricating the two electrode layers is extremely high due to the complexity of the structure and the low yield rate. In addition, in this type of EPDs, the electrodes are exposed to the solvent, which could result in an undesired electroplating effect. Electrophoretic displays comprising an in-plane gating electrode or a holding electrode to reduce or eliminate the cross bias and crosstalk of a passive matrix EPD have also been disclosed in copending patent applications, U.S. Ser. No. 10/242,335 filed on Sep. 11, 2002 (WO03/23510) and U.S. Ser. No. 10/282,444 filed on Oct. 28, 2002 (WO03/38512), respectively. However, the cost associated with the additional electrode is still an issue. Alternatively, magnetic particles and a magnetic electrode have been disclosed in U.S. Pat. No. 6,239,896 (assigned to Canon) to provide the required threshold, but also at the expense of manufacturing cost.

Therefore, there is a need for a cost effective method for inducing or enhancing the threshold voltage with a sharp gamma and high switching rate, without the trade-offs in image uniformity and display longevity, and without the need of complex circuitry designs.

The whole content of each document referred to in this application is incorporated by reference into this application in its entirety.

SUMMARY OF THE INVENTION

The first aspect of the present invention is directed to a method for inducing or enhancing the threshold voltage of an electrophoretic display, which method comprises adding a threshold promoter to an electrophoretic fluid comprising charged pigment particles or pigment-containing microparticles dispersed in a dielectric solvent or solvent mixture.

The second aspect of the invention is directed to an electrophoretic fluid comprising charged pigment particles or pigment-containing microparticles dispersed in a dielectric solvent or solvent mixture and a threshold promoter.

The third aspect of the invention is directed to an electrophoretic fluid comprising charged pigment particles or pigment-containing microparticles dispersed in a dielectric solvent or solvent mixture and a surface active threshold promoter.

The fourth aspect of the invention is directed to an electrophoretic fluid comprising charged pigment particles or pigment-containing microparticles having a threshold promoter dissolved or dispersed in the dielectric solvent or solvent mixture of the electrophoretic fluid or adsorbed or chemically bonded on the surface of the charged pigment particles or pigment-containing microparticles.

The fifth aspect of the invention is directed to an electrophoretic display comprising display cells filled with an electrophoretic fluid comprising charged pigment particles or pigment-containing microparticles dispersed in a dielectric solvent or solvent mixture and a threshold promoter.

The sixth aspect of the invention is directed to an electrophoretic display comprising display cells filled with an electrophoretic fluid comprising charged pigment particles or pigment-containing microparticles dispersed in a dielectric solvent or solvent mixture, a colorant or a mixture of colorants and a threshold promoter.

The threshold promoter may induce or significantly enhance the threshold effect by improving the particle-particle interaction and/or the particle-electrode interaction. The promoter may be present in the system as a soluble or micelle molecule in the electrophoretic fluid or an adsorbed or chemically bonded molecule on the surface of particles. The use of such a threshold promoter does not show a detrimental effect on the display switching rate.

BRIEF DESCRIPTION OF THE DRAWINGS

The present invention will be readily understood by the following detailed description in conjunction with the accompanying drawings.

DETAILED DESCRIPTION OF THE INVENTION

Definitions

Figure 1:
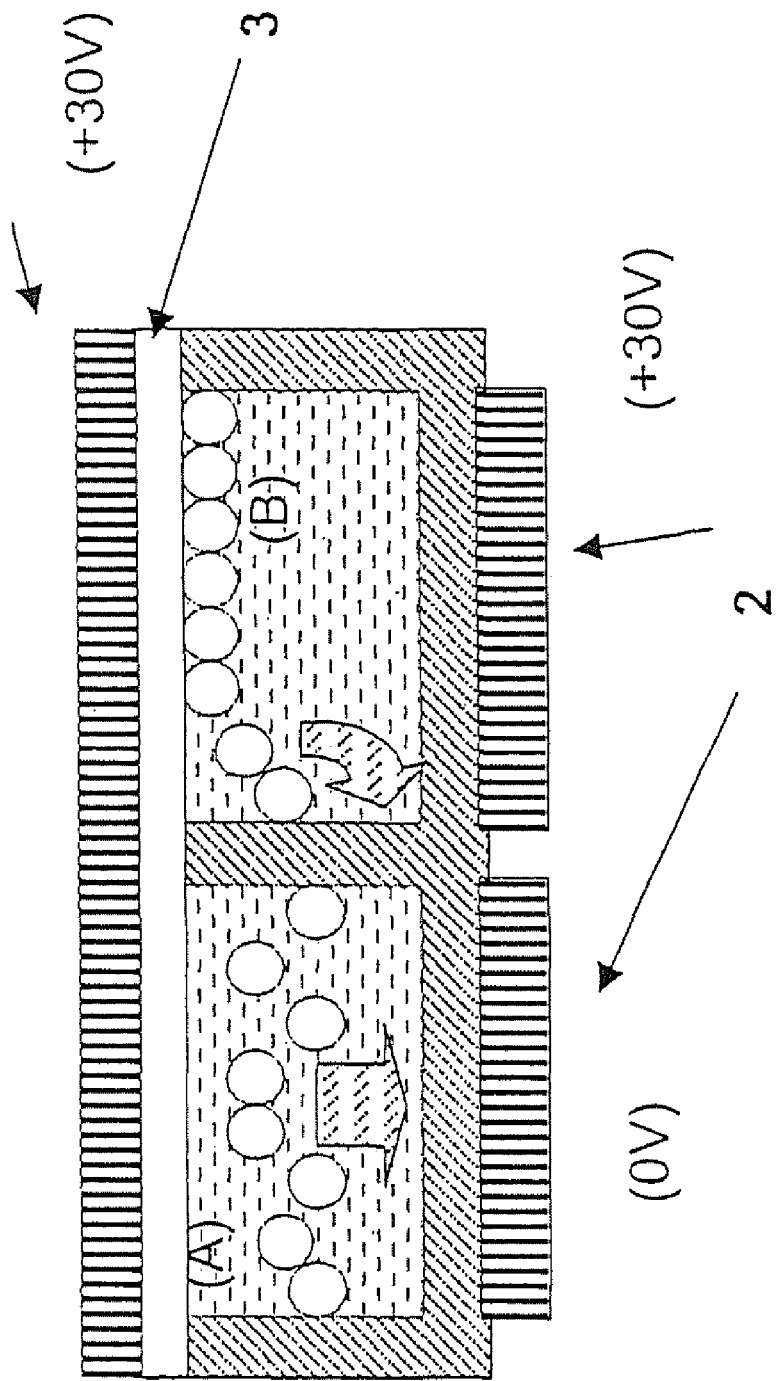
FIG. 1 is a schematic drawing to illustrate the "crosstalk" phenomenon. A and B are two cells of a passive matrix EPD each sandwiched between a top row electrode (1) and a bottom column electrode (2). There is also an electrode protection layer such as a sealing/adhesive layer (3) between the cells and the top electrode (1). The two cells, A and B, have a voltage bias of 30V and 0V, respectively. The particles in cell B are attracted to the bottom of the cell by the voltage bias between the top electrode of cell B (30V) and the bottom electrode of cell A (0V).

The term "threshold voltage", in the context of the present invention, is defined as the minimum voltage required for achieving an observable display contrast ratio within the time scale of scanning a row of cells (in a passive matrix display). It is the maximum bias voltage that may be applied to a cell without causing movement of particles between two electrodes on opposite sides of the cell.

The term "contrast ratio" is defined as the ratio of the reflectance of an electrophoretic display at the minimum optical density (Dmin) to the maximum optical density (Dmax) of the display background.

The term "gamma" is defined as the slope of the response vs. applied voltage curve.

The term "electrode protecting layer" refers to the sealing or adhesive layer in an electrophoretic display cell prepared by the microcup technology as disclosed in WO01/67170.

The term "alkyl" is broader than the customary chemical definition and refers to a linear, branched or cyclic hydrocarbon radical. Unless indicated otherwise, the alkyl moiety may have 1 to 30, preferably 1-12, carbon atoms. For example, it may be methyl, ethyl, octyl, n-decyl or the like which is optionally unsaturated such as ethenyl, 3-hexenyl or the like.

The term "heteroalkyl" refers to an "alkyl" as defined above in which one or more carbon atoms are replaced by O, S or N.

The term "aryl" refers to an organic radical derived from an aromatic ring having, unless indicated otherwise, 6 to 18 carbon atoms, such as phenyl, naphthyl, anthracenyl or the like.

The term "heteroaryl" refers to an organic radical derived from an aromatic hydrocarbon in which one or more of the ring carbon atoms are replaced by O, S or N, such as pyridyl, thienyl, furanyl or pyrrolyl.

The terms "halogenated" and "fluorinated" refer to a moiety which is partially or completely halogenated or fluorinated, respectively. For example, the term "fluorinated alkyl" refers to an alkyl group in which some or all of the hydrogen atoms are replaced with fluorine atoms.

The "alkyl" or "aryl" group, in the context of the present application, may be optionally substituted with one or more of the following: alkyl, aryl, alkylaryl, arylalkyl, $-NO_2$, NC—, HO(O)C—, R*O—, R*$_2$N—, R*S—, R*CO—, R*C(O)O—, R*O(O)C—, R*NHC(O)—, R*$_2$NC(O)—, R*NHC(O)O—, R*OC(O)NH—, R*C(O)NH—, R*C(S)NH—, R*NHC(O)NH—, R*NHC(S)NH—, R*SC(O)NH—, R*=N—, R*NHC(O)S— and the like wherein R* is an alkyl, aryl, alkylaryl or arylalkyl. Preferably, "alkyl" and "aryl" are unsubstituted or substituted with an alkyl or aryl, more preferably, unsubstituted.

I. Technical Background

Pigment Particles in the Electrophoretic Fluid

Suitable primary pigment particles are well known in the art. They are preferably white, and may be organic or inorganic pigments, such as $TiO_2$. If colored pigment particles are used, they may be formed from organic or inorganic pigments known in the art. Particle size of the primary pigment particles is preferably in the range of about 0.01 to about 5 microns, more preferably in the range of about 0.05 to about 2 microns. The primary pigment particles may exhibit a native charge, or may be charged explicitly using a charge controlling agent or may acquire a charge when suspended in the dielectric solvent. Suitable charge controlling agents are well known in the art; they may be polymeric or non-polymeric in nature and may also be ionic or non-ionic, including ionic surfactants.

Suitable charged primary pigment dispersions may be manufactured by any of the well-known methods including grinding, milling, attriting, microfluidizing and ultrasonic techniques.

Alternatively, the pigment particles may be pigment-containing microcapsules or microparticles. The pigment-containing microparticles may be prepared from a microparticle forming/microencapsultion process. Such a process may be accomplished chemically or physically. Typical microparticle forming/microencapsulation processes include interfacial polymerization, in-situ polymerization, phase separation, coacervation, electrostatic coating, spray drying, fluidized bed coating, solvent evaporation and the like.

Pigment-containing microparticles prepared from any of the processes known in the art may be used in the present invention.

One of the preferred microparticle forming processes is disclosed in the co-pending applications, U.S. Ser. No. 10/335,051 filed on Dec. 31, 2002 (corresponding to WO 03/57360), U.S. Ser. No. 10/335,210 filed on Dec. 31, 2002 (corresponding to WO 03/58335) and U.S. Ser. No. 10/632,171 filed on Jul. 30, 2003.

Briefly, the pigment-containing microcapsules may be prepared by a microencapsulation process involving the use of a protective colloid or dispersant to form part of the charged shell of pigment-containing microparticles or microcapsules. In the process, an internal phase dispersion comprising primary pigment particles such as $TiO_2$, a reactive monomer or oligomer and optionally a diluent is emulsified into a continuous phase which comprises a protective colloid, preferably a reactive protective colloid, in a fluorinated solvent or solvent mixture. During the emulsification step, a hard shell is formed around the internal phase particles as a result of the interfacial polymerization/crosslinking between the reactive monomer or oligomer from the internal phase and the reactive protective colloid and/or other reactants such as a reactive charge controlling agent (CCA) from the continuous phase. The internal phase may be post-cured by a radical or condensation polymerization/crosslinking mechanism during or after the shell-forming interfacial reaction step. The process allows the pigments to be density matched to the dielectric solvent. In addition, the reactive protective colloid or reactive CCA is chemically bonded to the surface of the pigment-containing microparticies. It greatly improves not only the dispersion stability of the microcapsules but also the switching performance and longevity of the display. Suitable reactive protective colloids and CCAs for the preparation of pigment-containing microcapsules are disclosed in the copending applications, U.S. Ser. No. 10/335,051 (WO03/57360) and U.S. Ser. No. 10/335,210 (WO0358335), both filed on Dec. 31, 2002.

Suitable reactive monomers or oligomers for interfacial polymerization/crosslinking include multifunctional isocyanates, thioisocyanates, epoxides, acid chlorides, chloroformates, alkoxysilanes, anhydrides, alcohols, thiols, amines and precondensates thereof. Preferred reactive monomers or oligomers are multifunctional amines (primary and secondary), thiols, isocyanates, thioisocyanates, epoxides and precondensates thereof. The reactive monomer or oligomer is present in the amount of from 5 to 300% by weight, more preferably from 50 to 150% by weight and most preferably from 80 to 120% by weight, based on the solid weight of the pigment-containing microparticles or microcapsules.

To facilitate the emulsification process, a fugitive solvent or diluent may be used to reduce the viscosity of the pigment pre-dispersion and it is removed later by heat and/or vacuum during or after the emulsification step. To facilitate the stripping process, the boiling point of the fugitive diluent is preferably lower than 160° C., more preferably lower than 120° C. Examples of suitable fugitive solvents include acetone, methyl ethyl ketone (MEK), methyl propyl ketone, cyclohexanone, ethyl acetate, propyl acetate, methylene chloride, tetrahydrofuran, toluene, xylene and the like.

The preferred protective colloids are disclosed in the co-pending application, U.S. Ser. No. 10/335,051. The protective colloid preferably comprises a reactive functional group capable of reacting with the reactive monomer or oligomer from the internal phase to form a crosslinked shell. Examples of suitable protective colloids include amino- or hydroxy-functionalized fluorinated, particularly perfluorinated polymers or oligomers derived from fluoro hydrocarbons, hydrofluoropolyethers or perfluoropolyethers (from DuPont and Solvay Solexis). The polyfluoroether amines are particularly useful. Suitable polyfluoroether amines have a molecular weight ranging from about 300 to about 50,000, preferably from about 500 to about 15,000. The protective colloid may be prepared under mild conditions by reacting a polyfluoroether substituted with at least one ester group with a multifunctional amine.

Suitable reactive charge controlling agents include the acid-base or donor-acceptor type charge controlling agents.

Suitable fluorinated solvents generally have low vapor pressure, low viscosity and a dielectric constant in the range of about 1.7 to about 30, more preferably about 1.7 to about 5. Examples of suitable fluorinated solvents include, but are not limited to, perfluoro solvents such as perfluoroalkanes or perfluorocycloalkanes (e.g., perfluorodecalin), perfluoroarylalkanes (e.g., perfluorotoluene or perfluoroxylene), perfluoro-tert-amines, perfluoropolyethers such as those from Galden/Fomblin and perfluoropolyethers HT series and hydrofluoropolyethers (ZT series) from Solvay Solexis, FC-43 (heptacosafluorotri-butylamine), FC-70 (perfluorotri-n-pentylamine), PF-5060 or PF-5060DL (pefluorohexane) from 3M Company (St. Paul, Minn.), low molecular weight (preferably less than 50,000, more preferably less than 20,000) polymers or oligomers such as poly(perfluoropropylene oxide) from TCI America (Portland, Oreg.), poly(chlorotrifluoroethylene) such as Halocarbon Oils from Halocarbon Product Corp. (River Edge, N.J.) and Demnum lubricating oils from Daikin Industries. Perfluoropolyethers and hydrofluoropolyethers such as Solvay Solexis HT-170, HT-200, HT-230, ZT-180 and DuPont trifluoro(trifluoromethyl)-oxirane homopolymers (such as K-6 and K-7 fluids) are particularly useful.

Alternatively, the pigment-containing microcapsules may be prepared by a microencapsulation process involving the use of a fluorinated quaternary salt or the fused ring or polynuclei derivatives or isomers thereof. The internal phase dispersion of the process comprises primary pigment particles and a reactive monomer or oligomer as described above. The continuous phase may optionally comprise a reactive protective colloid in a fluorinated solvent. The quaternary salt or a derivative thereof may be added to the internal dispersion phase, the continuous phase or both, depending on the solubility of the quaternary salt.

The emulsification of the internal dispersion phase and the continuous phase may be either a direct or inverse emulsification process. In the case of direct emulsification, the primary pigment particle dispersion ("I" phase) may be directly emulsified into the fluorinated solution ("F" phase). In the case of inverse emulsification, the fluorinated solution (the "F" phase) is gradually added and emulsified into the internal phase to first form an F-in-I (or F/I) emulsion. As the volume fraction of the "F" phase increases, the emulsion undergoes a phase inversion, i.e., the "F" phase becomes the continuous phase and the "I" phase becomes the dispersed phase to form an I-in-F (or I/F) emulsion. The phase inversion point may vary depending on the addition rate of the "F" phase, shear rate of the mixing and chemical properties such as interfacial tension and viscosity of the two phases.

After the phase inversion is completed, more reactive protective colloid and/or the fluorinated quaternary salt or a derivative thereof may be added to achieve better colloidal stability and a more complete interfacial reaction at the particle surface.

The total concentration of protective colloid used may range from about 0.1 to about 30% by weight, preferably from about 1 to about 20% by weight, based on the internal phase ("I"-phase). The concentration of the protective colloid and the fluorinated quaternary salt or a derivative thereof in the process may be adjusted for optimal efficiency of the microencapsulation process.

Suitable quaternary salts include the pyridinium, quinolinium, ammonium, acridinium, azolium salts or fused ring or polynuclei derivatives or isomers thereof. The quaternary salts in general may be found in "Cationic Surfactants: Organic Chemistry", Surfactant Science Series Vol. 34 (1990), Marcel Dekker; "High Technology Applications of Organic Colorants" by P. Gregory, (1991), Plenum Publishing Corp.; "The Sigma-Aldrich Handbook of Stains, Dyes, and Indicators" by F. J. Green, (1990), Aldrich Chemical Co.; and "Handbook of Imaging Materials" edited by A. S. Diamond and D. S. Weiss; (2001), Marcel Dekker. The specific quaternary salts suitable for this invention are disclosed in the copending application, U.S. Ser. No. 10/632,171 filed on Jul. 30, 2003.

Dielectric Solvents and Colorants for Electrophoretic Fluid

Suitable solvents are fluorinated solvents having low vapor pressure, low viscosity and a dielectric constant in the range of about 1.7 to about 30, more preferably about 1.7 to about 5. Specific examples are given in the previous section for the microencapsulation process.

In addition to the charged pigment particles, a colorant having a color contrasting the color of the particles may be added to the dielectric solvent or solvent mixture. The contrast colorant may be formed from dyes or pigments. Non-ionic azo and anthraquinone dyes are particularly useful. Examples of useful dyes include, but are not limited to, Oil Red EGN, Sudan Red, Sudan Blue, Oil Blue, Macrolex Blue, Solvent Blue 35, Pylam Spirit Black and Fast Spirit Black from Pylam Products Co., Arizona, Sudan Black B from Aldrich, Thermoplastic Black X-70 from BASF, and anthraquinone blue, anthraquinone yellow 114, anthraquinone reds 111 and 135 and anthraquinone green 28 from Aldrich. Perfluorinated dyes are particularly useful in this case where a fluorinated or perfluorinated dielectric solvent is used. If the contrasting colorant is insoluble in the dielectric solvent, a non-charged dispersion of the colorant is preferred. Particle size is preferably in the range of about 0.01 to about 5 microns, more preferably in the range of about 0.05 to about 2 microns. If the contrasting colorant particles are charged, they preferably carry a charge which is opposite from that of the charged primary color pigment particles. If both types of particles carry the same charge, then they should have different charge density or different electrophoretic mobility. In any case, the dye or pigment used in EPDs must be chemically stable and compatible with other components in the dispersion. The dye or pigment for producing the contrast colorant may be predispersed in the dielectric solvent and added into the electrophoretic fluid containing the primary color pigment dispersion. For a black/white EPD, the dispersion comprises charged white particles of titanium oxide ($TiO_2$) dispersed in a blackened fluorinated dielectric solvent. A black dye or dye mixture such as Pylam Spirit Black and Fast Spirit Black from Pylam Products Co., Arizona, Sudan Black B from Aldrich, Thermoplastic Black X-70 from BASF or a black pigment such as carbon black may be used to generate the black color of the solvent. Modification of the dyes or pigments by introducing fluorinated or perfluorinated side chains such as $C_nF_{2n+1}$ (n=4-12) is useful to increase their solubility or dispensability in highly fluorinated solvents. For a subtractive color system, the charged $TiO_2$ particles may be suspended in a fluorinated solvent of a cyan, yellow or magenta color. The cyan, yellow or magenta color may be generated via the use of a dye or a pigment. For a threshold voltage promoter color system, the charged $TiO_2$ particles may be suspended in a fluorinated solvent of a red, green or blue color generated also via the use of a dye or a pigment. For most applications, the additive color system is preferred.

Other suitable dyes include the fluorinated metal phthalocyanine or naphthalocyanine dyes. Suitable metals for the phthalocyanine or naphthalocyanine dyes include, but are not limited to, Cu, Si, Mg, Zn, Fe, Co, Ti and Al. The Si phthalocyanine or naphthalocyanine dyes disclosed in a copending application, U.S. Ser. No. 10/439,428 filed on May 15, 2003, are represented by the following formulas:

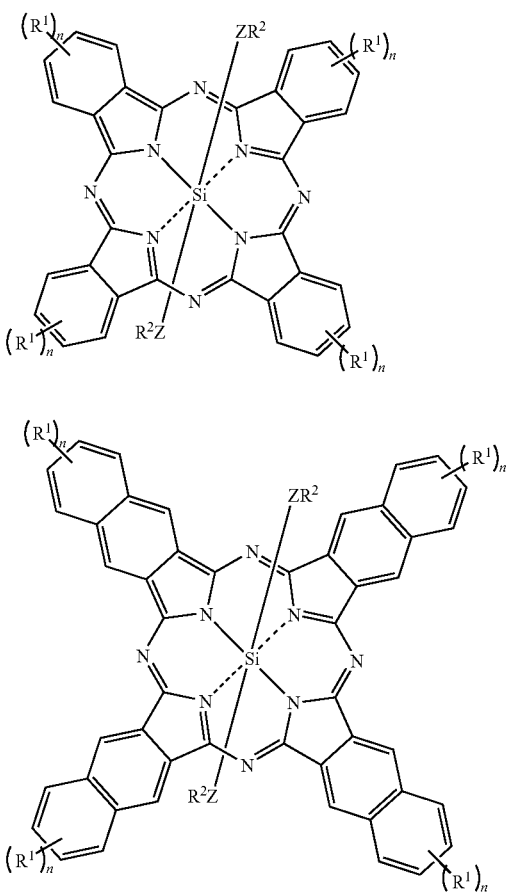

wherein:

each n is individually 0-4 for silicon phthalocyanine (I) or 0-6 for silicon naphthalocyanine (II);

$R^1$ is independently $R_f$-A- (wherein $R_f$ is as defined below and A is a single bond, —$CH_2O$—, —$CH_2CH_2$— or —CO—), alkyl, heteroalkyl, aryl, heteroaryl, alkylaryl, arylalkyl, R'O—, R'S—, R'R"N—, R'CO—, R—OCO—, R'COO—, R'CONR"—, R'R"NCO—, R'NHCONR"—, $R'SO_2NR"$— or $R'R"NSO_2$— (in which R' and R" are independently hydrogen, $R_f$ (as defined below), alkyl, heteroalkyl, aryl, heteroaryl, alkylaryl, arylalkyl) or halogenated, particularly fluorinated derivatives thereof;

Z is O or NR' wherein R' is defined as above;

$R^2$ is hydrogen, $R_f$—B— (wherein $R_f$ is as defined below and B is a single bond, —$CH_2$— or —$CH_2CH_2$—), alkyl, heteroalkyl or halogenated, particularly fluorinated derivatives thereof, or —$SiR^3R^4R^5$ wherein $R^3$, $R^4$, and $R^5$ are independently an alkyl or fluoroalkyl group of 1 to 20 carbon atoms or alkoxy or fluoroalkoxy of 2 to 40 carbon atoms; and $R_f$ is a low molecular weight (100-100,000) fluorinated polymeric or oligomeric moiety prepared from one or more types of fluorinated monomers.

The substituents, $R^1$, $R^2$, $R^3$, $R^4$, $R^5$, $R_f$ and n are so selected that the total fluorine content of the silicon phthalocyanine dye is at least 20%, preferably at least 30% and more preferably at least 50%, by weight of the dye molecule.

It will be recognized that when the preparation of the compounds involves the reaction of a formed phthalocyanine/naphthalocyanine or silicon phthalocyanine/naphthalocyanine with a reagent that inserts $R^1$ groups, the resulting product may be a mixture of compounds having different degrees of $R^1$ substitution on the phthalocyanine/naphthalocyanine rings, so that n, when not 0, may be different on each of the phenyl or naphthyl moiety within a compound; and it will also be recognized that substitution may occur at different positions on the different phenyl/naphthyl rings of the phthalocyanine/naphthalocyanine; and all such compounds are suitable dyes for the present invention. In addition, when n is not 0, not all $R^1$ groups need be the same, either within the compound as a whole or even on a particular phenyl or naphthyl moiety within a compound.

Preferred silicon dyes of Formula (I) and (II) are disclosed in the co-pending application, U.S. Ser. No. 10/439,428, filed on May 15, 2003.

The useful Cu phthalocyanine dyes are disclosed in U.S. Pat. No. 3,281,426. The most preferred Cu dye may be represented by the following formula:

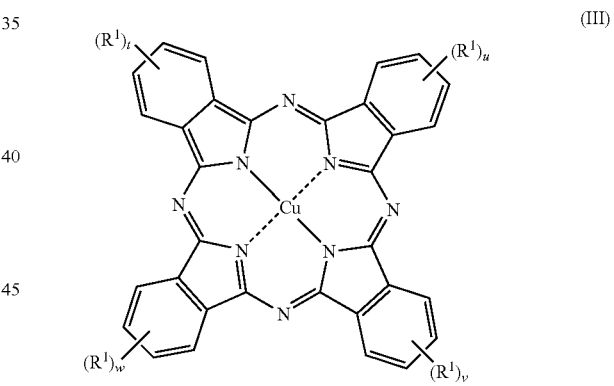

wherein $R^1$ is a fluorinated polymer or oligomeric chain or a fluorinated alkyl of 1 to 18 carbon atoms, preferably 4-12 carbon atoms; t, u, v and w are independently 0-4 and t+u+v+w≧3. More preferably, t, u, v and w are all 1.

The electrophoretic fluid may be colored by a single Si dye of Formula I or II or a single Cu dye of Formula III or a combination of the two dyes. When a mixture of the two dyes is used, the weight ratio of the Si dye to the Cu dye is preferably in the range of 7:3 to 1:9, more preferably in the range of 4:6 to 2:8.

II. Threshold Promoters

The first aspect of the present invention is directed to a method for inducing or enhancing the threshold characteristics of an EPD particularly when the electrode conductor is not in direct contact with the electrophoretic fluid, which method comprises adding a threshold promoter into an electrophoretic fluid which comprises charged pigment particles or pigment-containing microparticles dispersed in a dielectric solvent or solvent mixture. The threshold promoter may be added into the electrophoretic fluid during or after the preparation of the pigment dispersion. If pigment-containing microcapsules or microparticles are used in the electrophoretic fluid, the promoter may be added during or after the microencapsulation process.

In the case when an electrode protecting layer such as the sealing layer in a microcup-based EPD is used, the interaction between the electrode protecting layer and the particles may also be improved by such a threshold promoter. Useful threshold promoters include oligomers or polymers having one or more functional groups capable of forming hydrogen bonding, acid-base interaction, donor-acceptor interaction, metal-ligand interaction or Coulombic interaction with the functional group(s) on the surface of the pigment particles, electrodes or electrode protection layers.

Suitable molecular weight of the threshold promoter is from about 200 to about 1,000,000, preferably from about 300 to about 50,000, more preferably from about 500 to about 10,000.

Halogenated, particularly fluorinated, promoters are especially useful when a halogenated or fluorinated dielectric solvent is used.

Specific promoters may be represented by the following four formulas:

  (T-1)

  (T-2)

  (T-3)

  (T-4)

wherein:

m and m' are independently natural numbers which are $\geq 1$, preferably 1 or 2;

q and q' are independently natural numbers which are $\geq 1$, preferably from 1 to 10, more preferably 1 or 2;

R is a halogenated group, preferably fluorinated alkyl, fluorinated aryl, fluoroaryl-alkyl, aryl-fluoroalkyl, fluoroalkylaryl, alkyl-fluoroaryl or a halogenated, particularly fluorinated, polymeric or oligomeric chain;

Q and L or Q' and L' together forming a linking chain for linking the main chain (R) to the functional group, X or Y, or for linking the functional groups X and Y;

X and Y are independently functional groups capable of forming hydrogen bonding, acid-base interaction, donor-acceptor interaction, metal-ligand interaction or Coulombic interaction.

In R, the alkyl group referred to preferably has 3-40 carbon atoms and the aryl group preferably has 6-18 carbon atoms.

When R in Formulas T-1, T-2, T-3 and T-4 is a halogenated, preferably fluorinated, polymeric or oligomeric chain, it may be prepared by addition polymerization, condensation polymerization or ring-opening polymerization. Suitable monomers for the preparation of R by addition polymerization include, but are not limited to, acrylates, methacrylates, styrene and halogenated derivatives thereof; vinyls such as vinylfluoride, vinylidene fluoride, tetrafluoroethylene and chlorotrifluoroethylene. Suitable monomers for condensation polymerization include, but are not limited to, diesters, dicarboxylic acid and acid chlorides, acid anhydrides, diols, diamines, diisocyanates and the like. Suitable monomers for ring opening polymerization include, but are not limited to, oxiranes or cyclic ethers such as ethylene oxide, propylene oxide, tetrahydrofuran, tetrafluoroethylene oxide, perfluoropropylene oxide and perfluorofurane; and aldehydes such as trifluoroacetaldehyde.

Preferably, R comprises at least 20% by weight, more preferably at least 50% by weight, of fluorine.

The average molecular weight (MW) of R may be in the range of about 200 to about 5,000,000, preferably from about 300 to about 100,000, more preferably from about 500 to about 50,000.

In one of the embodiments, the R in Formulas T-1, T-2, T-3, and T-4 is represented by Formula (R) below:

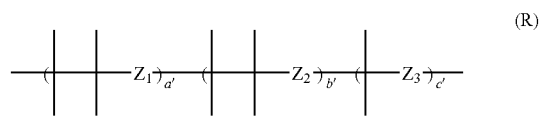  (R)

wherein the open substituent positions (not designated) on the main chain of Formula R can be the same or different and may independently be selected from a group consisting of hydrogen, halogen (especially fluoro), alkyl, alkenyl, aryl, alkylaryl, fluoroalkyl, fluoroalkenyl, fluoroaryl, fluoroalkylaryl, —$OR^{10}$, $OCOR^{10}$, —$COOR^{10}$, —$CONR^{10}R^{11}$ (wherein $R^{10}$ and $R^{11}$ are independently hydrogen, alkyl, aryl, alkylaryl, fluoroalkyl, fluoroaryl, fluoroalkylaryl or fluorinated polyether) and substituted derivatives thereof;

$Z_1$, $Z_2$, and $Z_3$ are independently oxygen or absent; and a', b' and c' are the weight fractions of the corresponding repeating units and are independently in the range of 0-1 with their sum no greater than 1.

In Formula (R), the alkyl group referred to preferably has 1-20 carbon atoms and the aryl group preferably has 6-18 carbon atoms.

In one embodiment, R is a fluoropolyether, preferably a perfluoropolyether.

In the case of Formula T-1, T-2, or T-3, wherein q is 1, one of the open substituent positions on the main chain of Formula R, preferably at one of the two end positions, is substituted with -Q-L-$(X)_m$, -Q-L-X-Q'-$(L'-Y)_m$ or -Q-L-$(X-Q'-L'-Y)_m$, and the remaining positions have substituents which may be the same or different, independently selected from the group identified above. In the case of Formula T-1, T-2 or T-3 wherein q is greater than 1, more than one of the open substituent positions on the main chain of Formula R are substituted with -Q-L-$(A)_m$, -Q-L-X-Q'-$(L'-Y)_m$ or -Q-L-$(X-Q'-L'-Y)_m$ and the remaining positions have substituents which may be the same or different, independently selected from the group identified above.

In the case of Formula T-4, $[(X)_m-L-Q]_q$ and $[Q'-L'-(Y)_{m'}]_{q'}$ are preferably substituted at the two end positions on the main chain of Formula R when q and q' are both 1.

The polymeric or oligomeric chain in Formula R may be a homopolymer, a random copolymer, a block copolymer or a grafted or comb type of copolymer.

The Q in -Q-L- or Q' in -Q'-L'- may be independently absent, ether (—O—), thioether (—S—), amide (—CON<, —$CONR^{12}$— or —$R^{12}NCO$—), imide [(—CO)$_2$N—], urea (—$R^{12}NCONR^{13}$—), thiourea (—$R^{12}NCSNR^{13}$—), urethane (—$OCONR^{12}$— or —$R^{12}NCOO$—), thiourethane (—$OCSNR^{12}$— or —$R^{12}NCSO$—), ester (—COO— or —OOC—), carbonate [—OC(O)O—], imine (=N—) or amine (—$NR^{12}$—) and the like wherein $R^{12}$ and $R^{13}$ are independently hydrogen, alkyl, aryl, alkylaryl, polyether and derivatives thereof, particularly halogenated derivatives such as fluoroalkyl, fluoroaryl, fluoroalkylaryl and fluorinated polyether. $R^{12}$ or $R^{13}$ preferably has 0-100 carbon atoms, more preferably 0-20 carbon atoms.

The L or L' in -Q-L- or -Q'-L'- is defined in the broadest sense. It may be a linking group of 1 to 100 carbon atoms, preferably 2-30 carbon atoms, optionally interrupted or substituted by heteroatoms such as oxygen, nitrogen or sulfur. It may be a straight or branched chain and may comprise one or more of the following groups: straight or branched, saturated or unsaturated hydrocarbon chain optionally substituted or interrupted by one or more heteroatoms, carbocyclic moiety or heterocyclic moiety, wherein said hydrocarbon chain, carbocyclic ring or heterocyclic ring are optionally substituted with one or more substituents which do not participate in hydrogen bonding, acid-base interaction, donor-acceptor interaction, metal-ligand interaction or Coulombic interaction with the functional group(s) on the surface of particles, electrodes or electrode protection layers. Such substituents may include, but are not limited to, halogen, alkyl, aryl, alkylaryl, arylalkyl and cyclic derivatives thereof.

The functional group X and Y may be —OH, —SH, —NH$_2$, —NH—, =N—, >N$^+$<, =N$^+$<, —CO—, —COO—, —OCO—, —COO$^-$, —COOH, —COOCO—, —O—, —CONR$^8$—, —CONH$_2$, —OCONR$^8$—, —NR$^8$COR$^9$, —R$^8$NCONR$^9$—, —CONR$^8$CO—, —OCOO—, —SO—, —SO$_2$—, —SO$_2$$^-$, —SO$_3$$^-$, —SO$_4$$^-$, —SO$_2$H, —SO$_3$H, —PO$_4$H$_2$, —PO$_4$$^{-2}$, —PO$_4$H$^-$, —PO$_3$H$_2$, —PO$_3$H$^-$, —SO$_2$NH—, —SO$_2$NR$^8$—, pyridinium or quaternary ammonium salt, metal or metal ions or chelated derivatives thereof (in which R$^8$ and R$^9$ are independently hydrogen, alkyl or fluorinated alkyl of 1 to 30 carbon atoms).

When the functional group X or Y is a pyridinium or quaternary ammonium salt, the salt is formed between the pyridinium or quaternary ammonium and a counterion. Preferred counterions may include, but are not limited to, inorganic anions such as F$^-$, Cl$^-$, Br$^-$, I$^-$, NO$_3$$^-$, NO$_2$$^-$, CO$_3$$^=$, SO$_3$$^=$, SO$_4$$^=$, PO$_3$$^=$, PO$_4$$^{3-}$, MnO$_4$$^-$, Cr$_2$O$_7$$^=$, BF$_4$$^-$, PF$_6$$^-$, AsF$_6$$^-$ or SbF$_6$$^-$; optionally fluorinated aliphatic carboxylates or sulfonates; anions of optionally fluorinated sulfonyl imides; anions of optionally fluorinated aromatic carboxylates or sulfonates or fluoropolyether substituted carboxylates or sulfonates.

The optionally fluorinated aliphatic sulfonates may be expressed as, but are not limited to, $C_aH_bF_{(2a+1-b)}SO_3^-$ wherein a is 1-30, preferably 1-12 and b is an integer determined based on the fluorine content (e.g., b may be 0-61, preferably 0-25). The optionally fluorinated aliphatic carboxylates may be expressed as, but are not limited to, $C_aH_bF_{(2a+1-b)}CO_2^-$ wherein a is 1-30, preferably 1-12 and b is an integer determined based on the fluorine content (e.g., b may be 0-61, preferably 0-25). The anions of optionally fluorinated sulfonyl imides may be expressed as, but are not limited to, $[C_aH_bF_{(2a+1-b)}SO_2]_2N^-$ wherein a is 1-30, preferably 1-12 and b is an integer determined based on the fluorine content (e.g., b may be 0-61, preferably 0-25). The anions of optionally fluorinated aromatic carboxylates or sulfonates may be expressed as, but are not limited to, $C_aH_bF_{(2a-7-b)}CO_2^-$ and $C_aH_bF_{(2a-7-b)}SO_3^-$ wherein a is 6 and b is an integer determined based on the fluorine content or $C_aH_bF_{(2a-13-b)}CO_2^-$ and $C_aH_bF_{(2a-13-b)}SO_3^-$ wherein a is 10 and b is an integer determined based on the fluorine content.

The "fluoropolyether" moiety of the fluoropolyether substituted carboxylates or sulfonates may be expressed as, but are not limited to, $F(C_3F_6O)_dCF(CF_3)CO_2^-$, $F(C_3F_6O)_d CF_2CF_2CO_2^-$, $CF_3O(C_2F_4O)_dCF_2CO_2^-$, $F(C_2F_4O)_d CF_2CO_2^-$, $F(C_3F_6O)_dCF(CF_3)SO_3^-$, $F(C_3F_6O)_d CF_2CF_2SO_3^-$, $CF_3O(C_2F_4O)_dCF_2SO_3^-$ or $F(C_2F_4O)_d CF_2SO_3^-$ wherein d is 1-20, preferably 1-10.

Among the threshold promoters disclosed, those of Formulas T-1, T-2 and T-4 are more preferred. In one embodiment, the group R is preferably a fluorinated alkyl of 6 to 30 carbon atoms or a polymeric or oligomer chain represented by Formula R. In Formula R, the open substituent positions are preferably substituted with fluorine atoms or fluorinated alkyl groups. In a further embodiment, $Z_1$ is preferably oxygen, $Z_3$ is preferably absent and b' is preferably 0. In a further embodiment, Q or Q' may be independently absent, an amide, urea, urethane, ester or amine moiety, preferably absent, an amide, urea or urethane moiety, more preferably absent or amide. L is preferably a straight or branched alkylene, alkylphenylene, fluorinated alkylene or fluorinated alkylphenylene chain optionally interrupted by one or more heteroatoms such as nitrogen, oxygen or sulfur, preferably nitrogen, more preferably an alkylene chain optionally interrupted by one or more heteroatoms, especially nitrogen. In a further embodiment, the functional groups X and Y are preferably —OH, —SH, —NH$_2$, —NH—, >N$^+$<, =N$^+$<, —COO$^-$, —CONR$^8$—, —CONH$_2$, —OCONR$^8$—, —NR$^8$COR$^9$, —R$^8$NCONR$^9$—, —CONR$^8$CO—, —SO$_3$$^-$, —SO$_4$$^-$, —SO$_2$NH—, —SO$_2$NR$^8$—, pyridinium or quaternary ammonium salt wherein R$^8$ and R$^9$ are as defined above, more preferably X and Y are independently hydroxy, amino or —NR$^8$COR$^9$ in which R$^8$ and R$^9$ are independently hydrogen, alkyl or fluorinated alkyl. The functional groups may also be a pyridinium salt formed with a counterion such as $C_aF_{2a+1}S_3^-$, $F(C_3F_6O)_d CF(CF_3)CO_2^-$ or $F(C_2F_4O)_dCF_2CO_2^-$ in which a is 1-12 and d is 1-20.

The threshold promoter may be present in the electrophoretic fluid in the amount of from about 0.1% by weight to about 20% by weight, preferably from about 0.2% by weight to about 5% by weight, based upon the total amount of pigment particles.

Some of the suitable threshold promoters are commercially available, for example, from Solvay Solexis (Thorofare, N.J.). Surface active compounds of the Formula T-1, T-2, T-3 or T-4 having high surface activity in halogenated, particularly fluorinated dielectric solvents, are especially preferred.

The compounds of Formula T-1, T-2, T-3 and T-4 may be synthesized by methods known in the art. Specific examples are given in the examples below. Compounds within the scope of the present application not specifically exemplified may be prepared by methods analogous to those exemplified.

For example, the threshold promoters having R being Formula R may be prepared from Krytox® having the formula of $F(C_3F_6O)_yCF(CF_3)COOH$, a Krytox® ester having the formula of $F(C_3F_6O)_yCF(CF_3)COOalkyl$ or a Krytox® alcohol having the formula of $F(C_3F_6O)_yCF(CF_3)CH_2OH$ (all available from DuPont). The synthesis of these threshold promoters preferably involves the formation of the linking moiety Q or Q'. For example, a threshold promoter having a Q or Q' being an amide moiety, may be formed by reacting an R moiety having an ester functional group with -L-X or L'-Y wherein L or L' has an amino functional group, and a threshold promoter having a Q or Q' being an urethane moiety, may be formed by reacting an R moiety having a primary alcohol moiety with -L-X or -L'-Y wherein L or L' has a isocyanate functional group. Methods for the formation of other linking moieties can be readily found in general organic chemistry textbooks. Additional information on synthetic methods may be found in U.S. Pat. Nos. 4,085,137, 4,094,911, 6,187,954, 6,162,521, 6,084,057, Caporiccio et al., "Low Temperature Elastomeric Polyamides containing Perfluorinated Polyether Building Blocks", Makromol. Chem., 184, 935-947 (1983), Malik et al., "Synthesis of Fluorinated Diisocyanates", J. Org. Chem., 56, 3043-3044 (1991), Journal of Polymer Science, Part A: Polymer Chemistry, Vol. 37, 557-570 (1999), Vol. 38, 2579-2602 (2000) & Vol. 40, 3771-3795 (2002) and Tonelli et al., "Perfluoropolyether Functional Oligomers: Unusual Reactivity in Organic Chemistry", Journal of Fluorine Chemistry, 118, 107-121 (2002).

The synthesis may also involve the modification of X or Y by methods known in the art.

For the threshold promoters which are pyridinium salts, the synthesis preferably starts from an appropriately substituted pyridine as shown in the examples below and in the co-pending application, U.S. Ser. No. 10/632,171, filed Jul. 30, 2003.

The second aspect of the invention is directed to an electrophoretic fluid comprising charged pigment particles or pigment-containing microparticles dispersed in a dielectric solvent or solvent mixture and a threshold promoter.

The third aspect of the invention is directed to an electrophoretic fluid comprising charged pigment particles or pigment-containing microparticles dispersed in a dielectric solvent or solvent mixture and a surface active threshold promoter.

The fourth aspect of the invention is directed to an electrophoretic fluid comprising charged pigment particles or pigment-containing microparticles having a threshold promoter adsorbed or chemically bonded on the surface of the charged pigment particles or pigment-containing microparticles.

The fifth aspect of the invention is directed to an electrophoretic display comprising display cells filled with an electrophoretic fluid comprising charged pigment particles or pigment-containing microparticles dispersed in a dielectric solvent or solvent mixture and a threshold promoter.

The sixth aspect of the invention is directed to an electrophoretic display comprising display cells filled with an electrophoretic fluid comprising charged pigment particles or pigment-containing microparticles dispersed in a dielectric solvent or solvent mixture, a colorant or a mixture of colorants and a threshold voltage promoter.

The display referred to in this application may be an electrophoretic display prepared by the microcup technology as described in WO01/67170 or an electrophoretic display prepared by the microencapsulation process as described in U.S. Pat. Nos. 5,961,804 and 5,930,026.

EXAMPLES

Preparation 1

Synthesis of $R_f$ Amine 2000

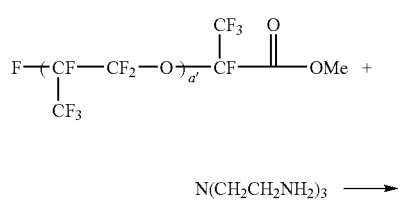

$N(CH_2CH_2NH_2)_3 \longrightarrow$

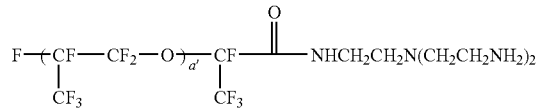

$R_f$ amine 2000 is represented by Formula T-1 wherein R is Formula R, Q is —C(O)NH—, L is —CH$_2$CH$_2$N(CH$_2$CH$_2$—)$_2$, m is 2, q is 1 and X is —NH$_2$.

19 Grams of Krytox® methyl ester (DuPont, MW=about 1900) was dissolved in a solvent mixture containing 12 gm of 1,1,2-trichlorotrifluoroethane (Aldrich) and 1.5 gm of α,α,α-trifluorotoluene (Aldrich). The resultant solution was added drop by drop into a solution containing 7.3 gm of tris(2-aminoethyl)amine (Aldrich) in 30 gm of α,α,α-trifluorotoluene and 35 gm of 1,1,2-trichlorotrifluoroethane over 2 hours with stirring at room temperature. The mixture was then stirred for another 8 hours to allow the reaction to complete. The IR spectrum of the crude product clearly indicated the disappearance of C=O vibration for methyl ester at 1780 cm$^{-1}$ and the appearance of C=O vibration for the amide product at 1695 cm$^{-1}$. Solvents were removed by rotary evaporation. The crude product was then dissolved in 50 ml of PFS2 solvent (a perfluoropolyether from Solvay Solexis) and extracted with 20 ml of ethyl acetate three times, then dried to yield 18 gm of purified product ($R_f$ amine 2000) which showed excellent solubility in HT200.

Preparation 2

Synthesis of $R_f$ Amide 2000

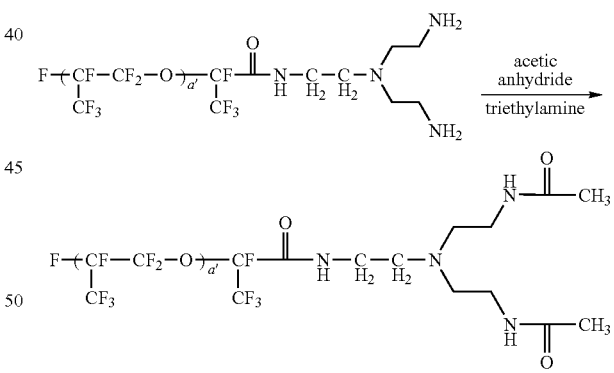

$R_f$ amide 2000 is represented by Formula T-1 wherein R is Formula R, Q is —C(O)NH—, L is —CH$_2$CH$_2$N(CH$_2$CH$_2$—)$_2$, m is 2, q is 1 and X is —NHC(O)CH$_3$.

10 Grams of $R_f$ amine 2000 prepared from Preparation 1 was dissolved in 50 ml of trichlorotrifluoroethane containing 1 gm of triethylamine. 0.64 Grams of acetic anhydride in 10 ml of trichlorotrifluoroethane was added dropwise over 30 minutes. The reaction mixture was stirred overnight. Solvent was removed by rotary evaporator. The crude product was then dissolved in 50 ml of PFS2 solvent and extracted with 20 ml of ethyl acetate three times, then dried to yield 9 gm of purified product. IR showed amine was converted to amide.

Preparation 3

Synthesis of R$_f$-trifluoromethylamide 2000

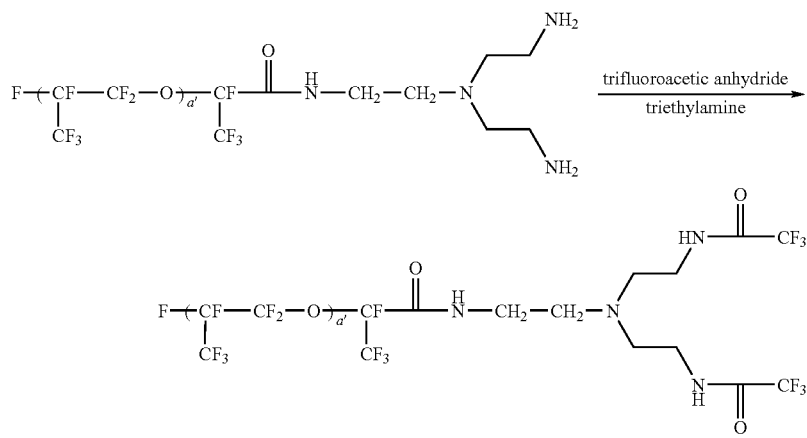

R$_f$-amide 2000 is represented by Formula T-1 wherein R is Formula R, Q is —C(O)NH—, L is —CH$_2$CH$_2$N(CH$_2$CH$_2$—)$_2$, m is 2, q is 1 and X is —NHC(O)CF$_3$.

10 Grams of R$_f$-amine 2000 prepared from Preparation 1 was dissolved in 50 ml of trichlorotrifluoroethane containing 1 gm of triethylamine. 1.3 Grams of trifluoroacetic anhydride in 10 ml trichlorotrifluoroethane was added dropwise over 30 minutes. The reaction mixture was then stirred overnight. The solvent was removed by rotary evaporator. The crude product was dissolved in 50 ml of PFS2 solvent and extracted with 20 ml of ethyl acetate three times, then dried to yield 8.5 gm of purified product. IR showed amine was converted to amide.

Preparation 4

Preparation of Quaternary Pyridinium Salts (F8POH and F8C1)

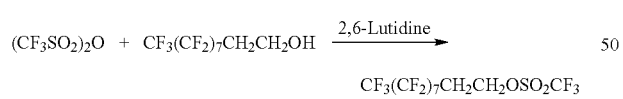

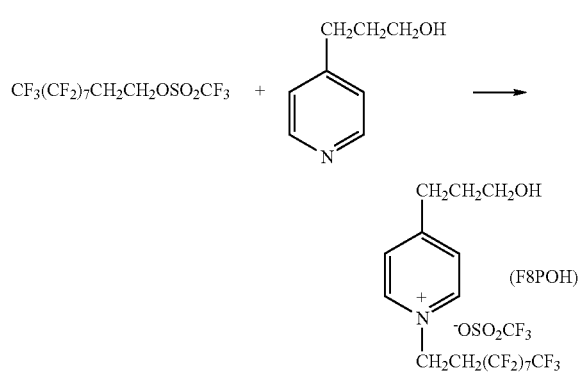

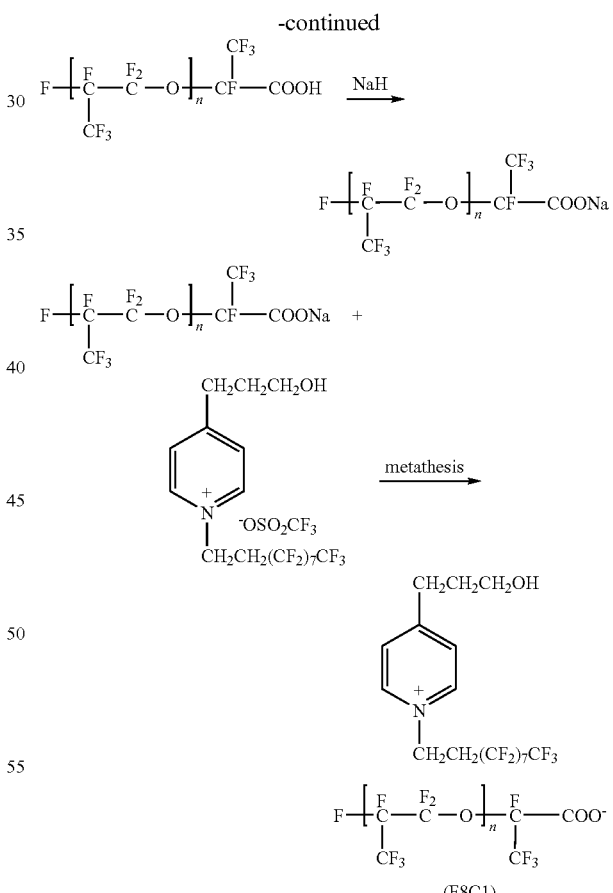

F8POH and F8C1 are represented by Formula T-2 wherein R is a fluorinated alkyl, m is 1, q is 1, both Q and Q' are absent, both L and L' are an alkylene chain, X is a pyridinium ion, Y is OH and the counterions are CF$_3$SO$_3^-$ and a perfluoropolyether substituted carboxylate, respectively.

3.21 Grams (30.0 mmol) of 2,6-lutidine (from Aldrich) and 11.6 gm (25.0 mmol) of 1H,1H,2H,2H-perfluorodecanol [CF$_3$(CF$_2$)$_n$CH$_2$CH$_2$OH, n=7, from SynQuest Laboratories, Inc.] were dissolved in 150 ml of chloroform and cooled in an ice/water bath. To the solution, 8.5 gm (30.0 mmol) of trifluoromethanesulfonic anhydride (from Aldrich) pre-dissolved in 100 ml of chloroform was added drop-wise with stirring over a period of 30 minutes, after which the ice/water bath was removed. The reaction mixture was stirred for at least another 8 hours at room temperature to allow the reaction to complete. The reaction mixture was washed with deionized water three times, dried over magnesium sulfate and the solvent was stripped off. The crude product was recrystallized from heptane/methylene chloride and rinsed with heptane. 12.45 Grams (yield: 83.6%) of a white crystal (1H,1H,2H,2H-perfluorodecyl triflate) was obtained.

5.96 Grams (10 mmol) of the thus obtained 1H,1H,2H,2H-perfluorodecyl triflate was added into a solution containing 30 ml of methylene chloride and 1.37 gm of (10 mmol) of 4-pyridinepropanol (Aldrich). The reaction mixture was stirred for 6 hours to allow the reaction to complete. After standing, the lower layer was separated and washed with 30 ml of methylene chloride three times. The solvent was evaporated to yield 5.59 gm of a light yellow solid, 1-(3,3,4,4,5,5,6,6,7,7,8,8,9,9,10,10-heptadecafluoro-decyl)-4-(3-hydroxy-propyl)-pyridinium trifluoromethanesulfonate.

0.22 Grams of sodium hydride (from Aldrich) was added in three portions into a solution containing 15 gm of Krytox FSL (perfluoropropylene ether carboxylic acid, from DuPont, MW=2500), 30 gm of HFE-7200 (from 3M) and 10 gm of anhydrous ether (from Aldrich) during a period of an hour. Hydrogen was generated immediately. The reaction mixture was then stirred for another eight hours before excess sodium hydride was filtered out with a 0.45 μm membrane filter. Solvent was evaporated to obtain 14 gm of sodium Krytox carboxylate. IR showed the carbonyl vibration of the product was at 1693 cm$^{-1}$ and 1658 cm$^{-1}$ while the carbonyl vibration for Krytox FSL was at 1770 cm$^{-1}$.

14 Grams of sodium salt of Krytox 157FSL was dissolved in 100 ml of methanol, to which 5.25 gm of F8POH (prepared as intermediate in Preparation 4) was added and dissolved. The appearance of two phases was observed. The methanol solution was extracted twice with 100 ml of PFS2 (a fluorinated solvent from Solvay Solexis). The combined PFS2 layer was extracted with 50 ml of methanol twice, dried over sodium sulfate, filtered and stripped of solvent to yield 13 gm of the product. The spectrum of $^{19}$FNMR showed all of the triflate counter-ion was replaced with Krytox carboxylate.

Preparation 5

Preparation of Quaternary Pyridinium Salt (FNC1)

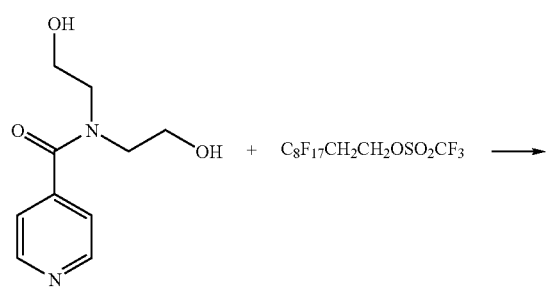

-continued

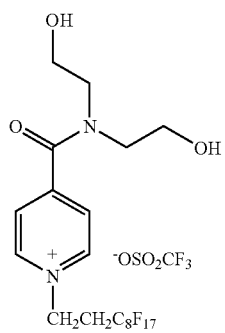

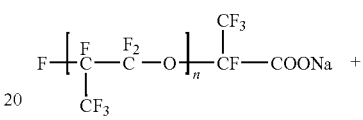

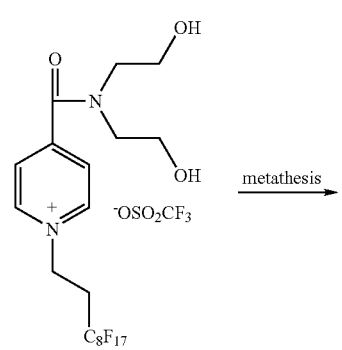

metathesis →

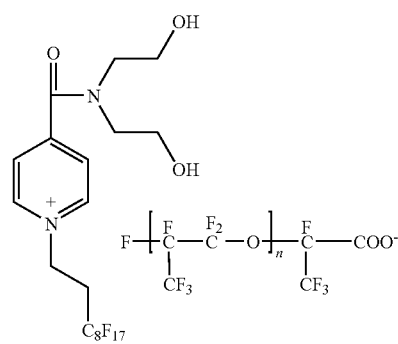

(FNC1)

FNC1 is represented by Formula T-2 wherein R is a fluorinated alkyl, m is 2, q is 1, Q is absent, Q' is —C(O)N<, both L and L' are an alkylene chain, X is a pyridinium ion, Y is OH and the counterion is a fluoropolyether substituted carboxylate.

36 Grams (0.06 mol) of 1H,1H,2H,2H-perfluorodecyl triflate was dissolved in 50 ml of 1,1,2-trichlorotrifluoroethane and 200 ml of acetonitrile. The solution was stirred and heated to 40° C. while 12.7 gm (0.06 mol) of N,N-bis(2-hydroxyethyl)isonicotinamide was added in three portions during a period of three hours. The solution was kept stirring at 40° C. for another three hours. After evaporation of the solvent, 45 gm of a white powder, N,N-bis(2-hydroxyethyl)-N'-1H,1H, 2H,2H-perfluorodecyl isonicotinamide, was obtained. The product and purity were confirmed by $^1$HNMR and $^{19}$FNMR.

10 Grams of sodium salt of Krytox 157FSL was dissolved in 100 ml of methanol, to which 3.9 gm of fluorocarbon modified pyridinium salt, N,N-bis(2-hydroxyethyl)-N'-(3,3,4,4,5,5,6,6,7,7,8,8,9,9,10,10-heptadecafluoro-decyl) isonicotinamide trifluoromethanesulfonate, was added and dissolved. The appearance of two phases was observed. The methanol solution was extracted twice with 100 ml of PFS2. The combined PFS2 layer was extracted with 50 ml of methanol twice, dried over sodium sulfate, filtered and stripped of solvent to yield 9 gm of the product. The spectrum of $^{19}$FNMR showed all of the triflate counter-ion was replaced with Krytox carboxylate.

Preparation 6

Synthesis of Fluorinated Cu Phthalocyanine Dyes

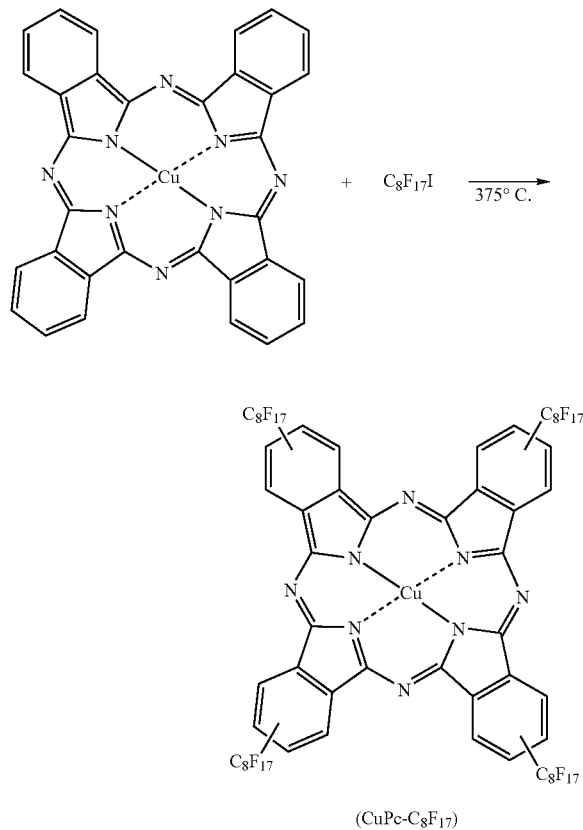

(CuPc-C$_8$F$_{17}$)

The fluorinated Cu phthalocyanine dye was prepared according to U.S. Pat. No. 3,281,426. A mixture of copper phthalocyanine (41.0 gm, 71.2 mmole, Aldrich) and 1-iodoperfluorooctane (370 gm, 678 mmole, SynQuest) was added into a 1-gallon pressure reactor (Parr Instrument Co.) with a glass liner. The reactor was vacuum sealed at 1 Torr and heated at 375° C. for 3 days. The crude product obtained was mixed with 200 gm of Celite (Fisher Scientific) and extracted with 4 L of PFS-2™ in Soxhlet extractor for 5 days. The dark blue solution obtained was washed with 4 L of acetone 3 times and evaporated to dryness by rotary evaporation (60° C.) under vacuum (~5 Torr). A dark blue solid was obtained (106 gm, 66% yield).

Preparation 7

Synthesis of Fluorinated Si Phthalocyanine Dye (SiPc-C$_8$F$_{17}$)

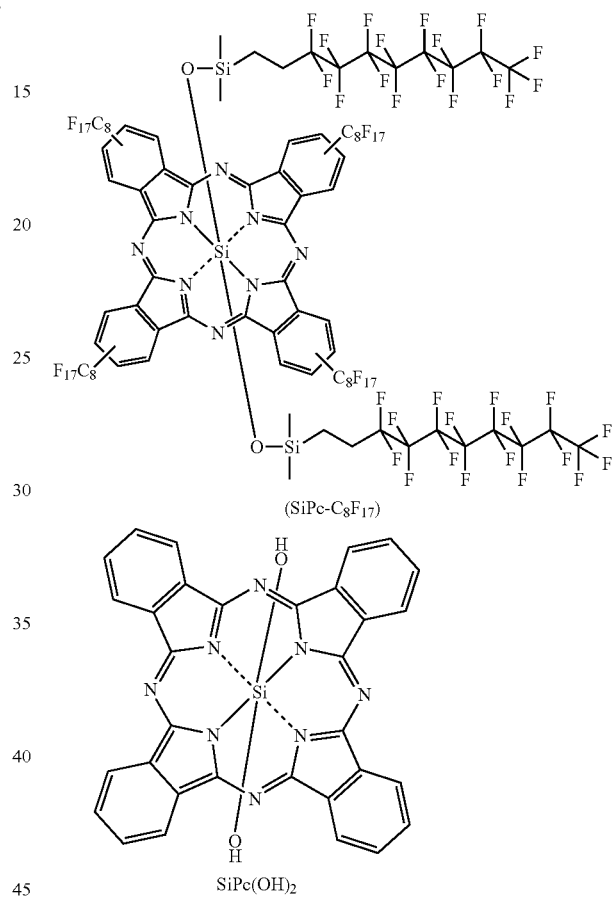

A mixture of (heptadecafluoro-1,1,2,2-tetrahydrodecyl) dimethylchloro-silane (2.50 gm, 4.63 mmol, Gelest) and a suspension of SiPc(OH)$_2$, (1.00 gm, 1.74 mmol, Aldrich) and pyridine (140 ml, Fisher Scientific), where each had been dried by distillation (~10 mL of distillate), was slowly distilled for 5 hours (~55 ml distillate). The resulting dark blue solution was evaporated to dryness by rotary evaporation (60° C.) under pump vacuum (1 Torr). The solid obtained was washed with an EtOH—H$_2$O mixture (1:1, 50 ml) and removed by filtration, dried (60° C., 60 Torr), dissolved in CH$_2$Cl$_2$ (120 ml) and filtered. The filtrate was evaporated to dryness by rotary evaporation (60° C.) under pump vacuum (1 Torr). A blue solid [2.26 gm, 82% based on SiPc(OH)$_2$] was obtained.

Preparation 8

Preparation of TiO$_2$-Containing Microparticles-1

9.50 Grams of Desmodur® N3400 aliphatic polyisocyanate (from Bayer AG) and 0.49 gm of TEA (triethanolamine from Dow) were dissolved in 3.79 gm of acetone. To the resultant solution, 13 gm of $TiO_2$ R706 (DuPont) was added and homogenized for 2 minutes 30 seconds with a rotor-stator homogenizer (IKA ULTRA-TURRAX T25) in room ambient; a solution containing 1.67 gm of 1,5-pentanediol (BASF), 1.35 gm of polypropylene oxide (MW=725 from Aldrich), 0.45 gm of F8POH (from Preparation 4) and 2.47 gm of acetone was added and homogenized for 1 minute. To the resultant solution, 0.32 gm of an acetone solution containing 2% dibutyltin dilaurate (Aldrich) was added and homogenized for 2 minutes. Finally, 40.0 gm of a HT-200 (Solvay Solexis) solution containing 0.8 gm of $R_f$-amine4900 (from Preparation 1) was added and homogenized for 2 minutes, following by addition of 33.0 gm of a HT-200 solution containing 0.6 gm of $R_f$-amine4900 and 0.35 gm of the perfluorinated Cu phthalocyanine dye $CuPc-C_8F_{17}$ (from Preparation 6) and homogenization for 2 minutes. The resultant microcapsule dispersion was then heated at 80° C. overnight and stirred under low shear to post cure the particles.

Preparation 9

Preparation of $TiO_2$-Containing Microparticles-2

7.14 Grams of Desmodur® N3400 aliphatic polyisocyanate (from Bayer AG) was dissolved in 5.4 gm of acetone. To the resultant solution, 13 gm of $TiO_2$ R706 (DuPont) was added and homogenized for 2 minutes with a rotor-stator homogenizer (IKA ULTRA-TURRAX T25) in room ambient; a solution containing 1.14 gm of 1,5-pentanediol (BASF), 0.24 gm of TEA (Dow), 2.20 gm of polypropylene oxide (MW=725 from Aldrich), and 1.0 gm of acetone was added and homogenized for 30 seconds. To the resultant solution, 0.29 gm of an acetone solution containing 2% dibutyltin dilaurate (Aldrich) was added and homogenized for 2 minutes. Finally, 40.0 gm of a HT-200 (Solvay Solexis) solution containing 0.9 gm of $R_f$-amine4900 (prepared by the procedure as described in Preparation 1) was added and homogenized for 2 minutes, followed by addition of 33.0 gm of a HT-200 solution containing 0.9 gm of $R_f$-amine4900 and homogenization for 2 minutes. The resultant microcapsule dispersion was then heated at 70° C. overnight and stirred under low shear to post cure the particles.

Preparation 10

Preparation of Display Sample

A. Primer Coated Transparent Conductor Film

A primer coating solution containing 1.42 gm of Irostic® P9815 (polyurethane, Huntsman, Germany), 2.21 gm of CN983 (urethane diacrylate, Sartomer, Exton, Pa.), 1.10 gm of EB1290 (hexafunctional aliphatic urethane acrylate, UCB, Smyrna, Ga.), 0.13 gm of Irgacure™ 369 (2-benzyl-2-(dimethylamino)-1-[4-(4-morpholinyl)phenyl]-1-butanone, Ciba, Tarrytown, N.Y.), 0.13 gm of Sarcure SR1 124 (isopropyl thioxanthone, Sartomer, Exton, Pa.), 0.03 gm of Irganox™ 1035 (thiodiethylene bis(3,5-di(tert)-butyl-4-hydroxyhydrocinnamate, Ciba Tarrytown, N.Y.), 80 gm of MEK (methyl ethyl ketone) and 15 gm of CHO (cyclohexanone) was mixed thoroughly and coated onto a 5 mil transparent conductor film (ITO/PET film, 5 mil OC50 from CPFilms, Martinsville, Va.) using a T#4 drawdown bar. The coated ITO film was dried in an oven at 65° C. for 10 minutes, and then exposed to 1.4 $J/cm^2$ of UV light under air using a UV conveyer (DDU, Los Angles, Calif.).

B. Preparation of Microcups

| Microcup Composition | | |
|---|---|---|
| Component | Weight Part | Source |
| EB 600 | 35.927 | UCB |
| SR 399 | 34.941 | Sartomer |
| HDDA | 22.337 | UCB |
| EB1360 | 6.503 | UCB |
| Irgacure 369 | 0.217 | Ciba |
| Sarcure SR1124 | 0.043 | Sartomer |
| Antioxidant Ir1035 | 0.033 | Ciba |

35.93 Gm of EB 600™ (acrylated epoxy oligomer, UCB, Smyrna, Ga.), 34.94 gm of SR 399™ (pentafunctional monomer, Sartomer, Exton, Pa.), 6.50 gm of EB1360™ (silicone acrylate, UCB, Smyrna, Ga.), 0.22 gm of Irgacure™ 369 (Ciba, Tarrytown, N.Y.), 0.043 gm of Sarcure SR1124 (ITX, Isopropyl-9H-thioxanthen-9-one, Sartomer, Exton, Pa.), 0.033 gm of Irganox™ 1035 (Ciba, Tarrytown, N.Y.) and 20.34 gm of HDDA (1,6-hexanediol diacrylate, UCB, Smyrna, Ga.) were mixed thoroughly with a Stir-Pak mixer (Cole Parmer, Vernon, Ill.) at room temperature for about 1 hour and debubbled by a centrifuge at 2000 rpm for about 15 minutes.

The microcup composition was slowly coated onto a 8"×8" electroformed Ni male mold for an array of 90 μm (length)× 90 μm (width)×27 μm (depth)×11 μm (width of top surface of the partition wall between microcups) microcups. A plastic blade was used to remove excess of fluid and gently squeeze it into "valleys" of the Ni mold. The coated Ni mold was heated in an oven at 65° C. for 5 minutes and laminated with the primer coated ITO/PET film prepared in Preparation 10A, with the primer layer facing the Ni mold using a Hot Roll Laminator (ChemInstrument, Fairfield, Ohio) preset at a roller temperature of 200° F., lamination speed of 1 cm/sec and the roll pressure is 80 psi. A UV curing station with a UV intensity of 1.2 $mw/cm^2$ was used to cure the panel for 5.5 seconds. The ITO/PET film was then peeled away from the Ni mold at a peeling angle of about 30 degree to give a 8"×8" microcup array on ITO/PET. An acceptable release of the microcup array from the mold was observed. The thus obtained microcup array was further post-cured with a UV conveyor curing system (DDU, Los Angles, Calif.) with a UV dosage of 2.8 $J/cm^2$.

C. Filling and Sealing of the Microcups

An electrophoretic dispersion was filled into the microcup prepared from Preparation 10B using a #0 drawdown bar. The filled microcups were then overcoated with a top-sealing/ adhesive solution consisting of 11.9 parts (dry) by weight of polyurethane IP9820-15, 2.1 parts by weight of CN983 (urethane diacrylate), 0.1 parts by weight of Irgacure 907 (2-methyl 1-[4-(methylthio)phenyl]2-morpholinopropan-1-one), 40.8 parts by weight of MEK, 40.8 parts by weight of IPAc and 4.3 parts by weight of CHO (cyclohexanone) with a doctor blade. The sealing layer was air-dried for 10 minutes and heated in an 80° C. oven for 2 minutes to form a seamless sealing on the filled microcup. The targeted (dry) thickness of the sealing layer was about 3~4 microns. The top-sealed microcup was laminated directly onto a 5 mil ITO/PET film by a laminator at 120° C. at a linear speed of 20cm/min. After lamination, the sample was further UV cured by passing through a UV conveyer twice at the speed of 10 ft/min with a UV intensity of 2.56 $W/cm^2$ (which is equivalent to 0.856 $J/cm^2$).

Electro-Optic Response of EPDs

The electro-optic response of all exemplified EPDs was measured by bringing an incoming light from an optical fiber cable connected to a light source and illuminating on a display cell prepared in Preparation 10. The back side of the display cell was blackened completely by a black paint.

The reflecting light from the display sample was then collected and converted into electrical signal by a photo-electric detector and finally recorded and displayed on an oscilloscope. The intensity of output waveform correlates to the contrast ratio between ON and OFF state of the display and the slope of optical output waveform reflects the response time of the display during switch.

Examples 1-2

Unless specified otherwise, all wt % in the electrophoretic fluid formulations exemplified in Examples 1-2 and others are on dry weight basis based on the total fluid.

Example 1

Comparative Example

Figure 2:
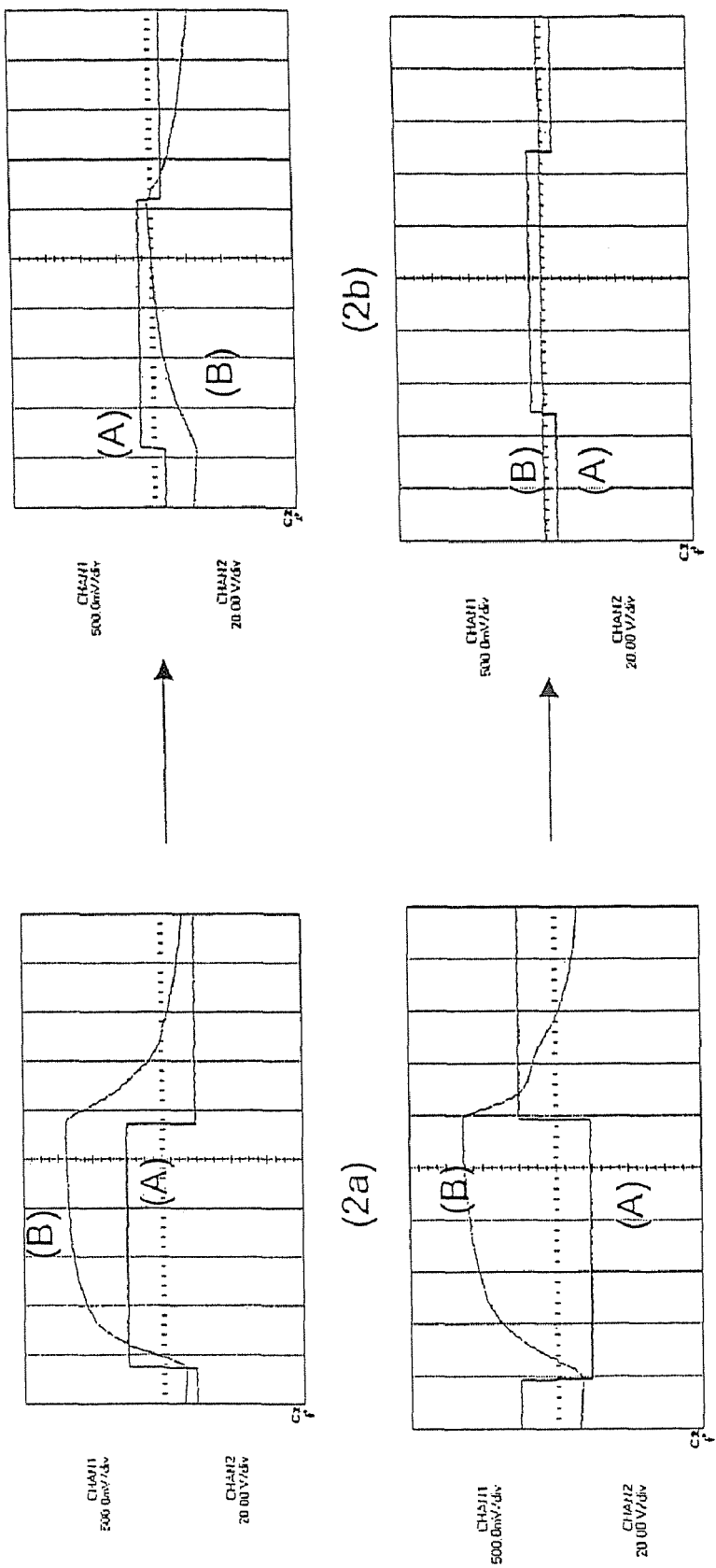
FIG. 2a show the electro-optical response of the displays of Examples 1-2; 2a and 2b for Comparative Example 1 measured at ±20V/0.2 Hz and +7V/0.2 Hz, respectively; and 2c and 2d for Example 2 measured at ±20V/0.2 Hz and ±7V/0.2 Hz, respectively. Unless specified otherwise, the (A) curve in all electro-optical response plots is the electrical input pulse and (B) is the optical signal output.

An EPD cell was prepared according to the procedure of Preparation 10 using an electrophoretic fluid containing 8 wt % (dry) of the $TiO_2$-containing microparticles (from Preparation 8) and 1.2 wt % (dry) of $CuPc-C_8F_{17}$ dye (as prepared in Preparation 6) in HT-200. FIGS. 2a and 2b show the electro-optical response of the display measured at ±20V and ±7V, respectively. In all the electro-optical response curves mentioned hereafter, Curve A is the electrical input pulse and Curve B is the optical response signal. The amplitude of the optical signal is a measure of the display contrast ratio. When the display was driven at ±20V, a strong electro-optical response was observed as shown in FIG. 2a. When the display was driven at one-third of the driving voltage, i.e., ±7V, a moderate electro-optic response was observed as shown in FIG. 2b. The observed moderate signal at ±7V indicates that the threshold voltage is lower than 7V, the minimum voltage (⅓ of the operation voltage) required to eliminate the cross-bias effect in a passive matrix device driven at ±21V.

Example 2

Improvement of Threshold Voltage by Fluorolink D10 (a Dihydroxy-terminated Perfluoropolyether)

The same procedure of Comparative Example 1 was followed except that 0.5 wt % (based on the weight of $TiO_2$-containing microparticles used) of Fluorolink D10 (from Solvay Solexis) was added to the electrophoretic fluid. Fluorolink D10 has the formula of $HOH_2CCF_2O(CF_2CF_2O)_m(CF_2O)_nCF_2CH_2OH$ which is Formula T-4 wherein R is a perfluoropolyether moiety, Q and Q' are absent, both L and L' are methylene, both X and Y are —OH, both m and m' are 1 and both q and q' are 1.

FIGS. 2c and 2d show the electro-optic response of the display of Example 2 driven at ±20V and ±7V, respectively. The display had a strong electro-optic response when it was driven at ±20V (FIG. 2c); but no response at all when it was driven at ±7V (FIG. 2d). The lack of electro-optic response at ±7V indicates a threshold voltage of at least 7V. This implies that a passive matrix display without the undesirable cross-bias effect at an operation voltage of ±21V or lower is feasible with the electrophoretic fluid of Example 2.

Examples 3-5

Improvement of Threshold Voltage by $R_f$-amine 2000

Example 3

Comparative Example

The same procedure of Comparative Example 1 was followed except that an electrophoretic fluid containing 6 wt % of the $TiO_2$-containing microparticles (from Preparation 8) and 1.3 wt % of $CuPc-C_8F_{17}$ dye (from Preparation 6) was used.

Figure 3:
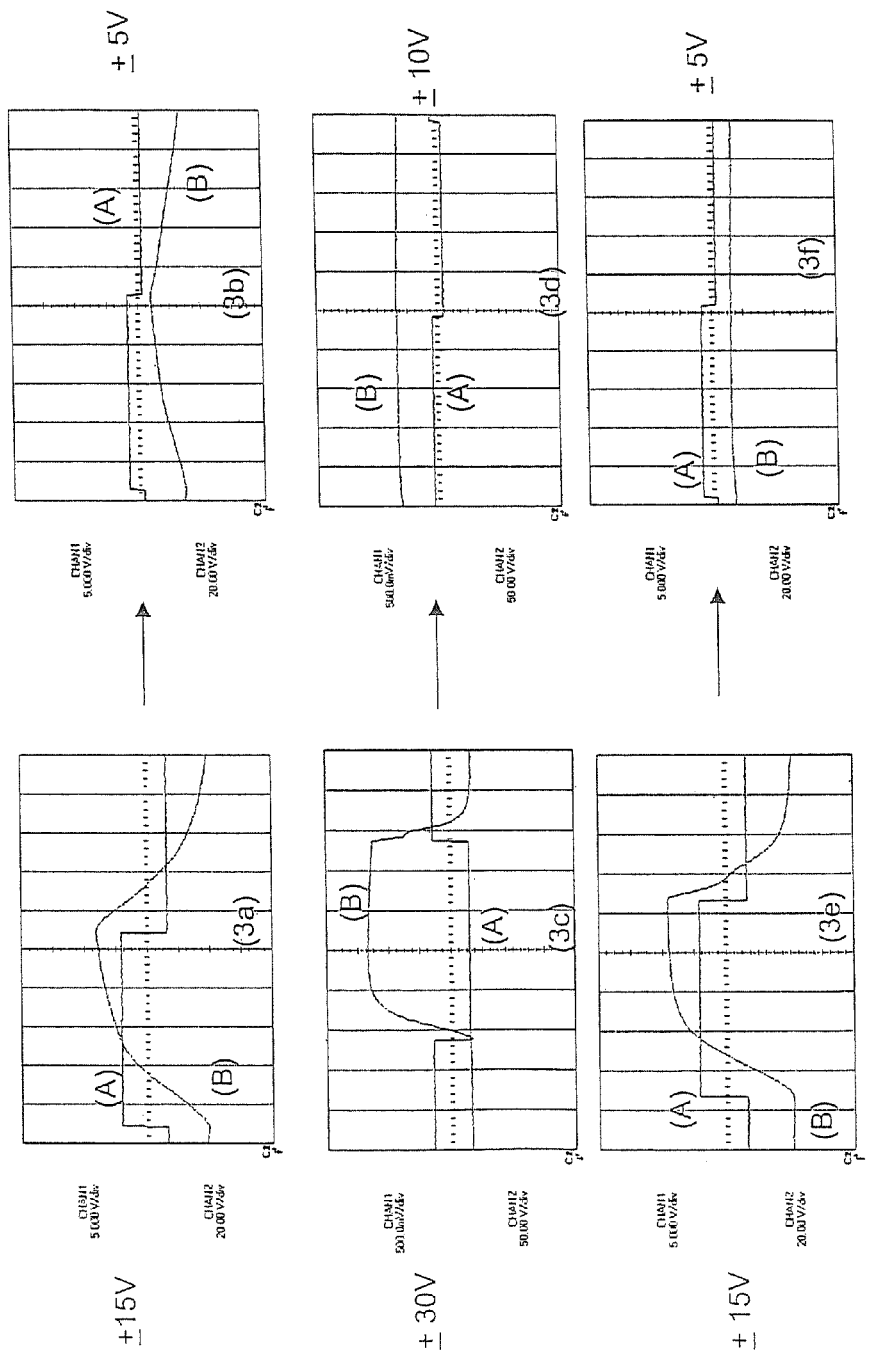
FIG. 3a show the electro-optical response of the displays of Examples 3-5; 3a and 3b for Comparative Example 3 measured at ±15V/0.2 Hz and ±5V/0.2 Hz, respectively; 3c and 3d for Example 4 measured at ±30V/0.2 Hz and ±10V/0.2 Hz, respectively; and 3e and 3f for Example 5 measured at ±15V/0.2 Hz and ±5V/0.2 Hz, respectively.

FIG. 3a shows a strong electro-optic response of Comparative Example 3 driven at ±15V. When the display was driven at ±5V, a weak electro-optic response was observed as shown in FIG. 3b.

Example 4

The same procedure of Comparative Example 1 was followed except that an electrophoretic fluid containing 6 wt % of the $TiO_2$-containing microparticles (from Preparation 8), 1.3 wt % of $CuPc-C_8F_{17}$ dye (from Preparation 6) and 0.5 wt % (based on the weight of $TiO_2$-containing microparticles used) of $R_f$-amine 2000 (from Preparation 1) was used.

As shown in FIGS. 3c and 3d that a strong and fast electro-optical response at ±30V but no response at all was observed at ±10V. This indicates that a passive matrix display without the undesirable cross-bias effect at an operation voltage of ±30V or lower is feasible with the electrophoretic fluid of Example 4.

Example 5

The same procedure of Comparative Example 1 was followed except that an electrophoretic fluid containing 6 wt % of the $TiO_2$-containing microparticles (from Preparation 8), 1.3 wt % of $CuPc-C_8F_{17}$ dye (from Preparation 6), 1.5 wt % (based on the weight of $TiO_2$-containing microparticles used) of $R_f$-amine 2000 (from Preparation 1) and 10 wt % of a co-solvent ZT180 (from Solvay Solexis) was used.

A strong electro-optic response at ±15V was observed as shown in FIG. 3e. No electro-optical response at all was observed at ±5V (FIG. 3f). It is evident that the addition of $R_f$-amine 2000 and co-solvent ZT180 enables a high contrast passive matrix display at an operation voltage of ±15V or lower.

Examples 6-7

Frequency-dependent Threshold Characteristics by $R_f$-trifluoromethylamide 2000

Example 6

Comparative Example

Figure 4:
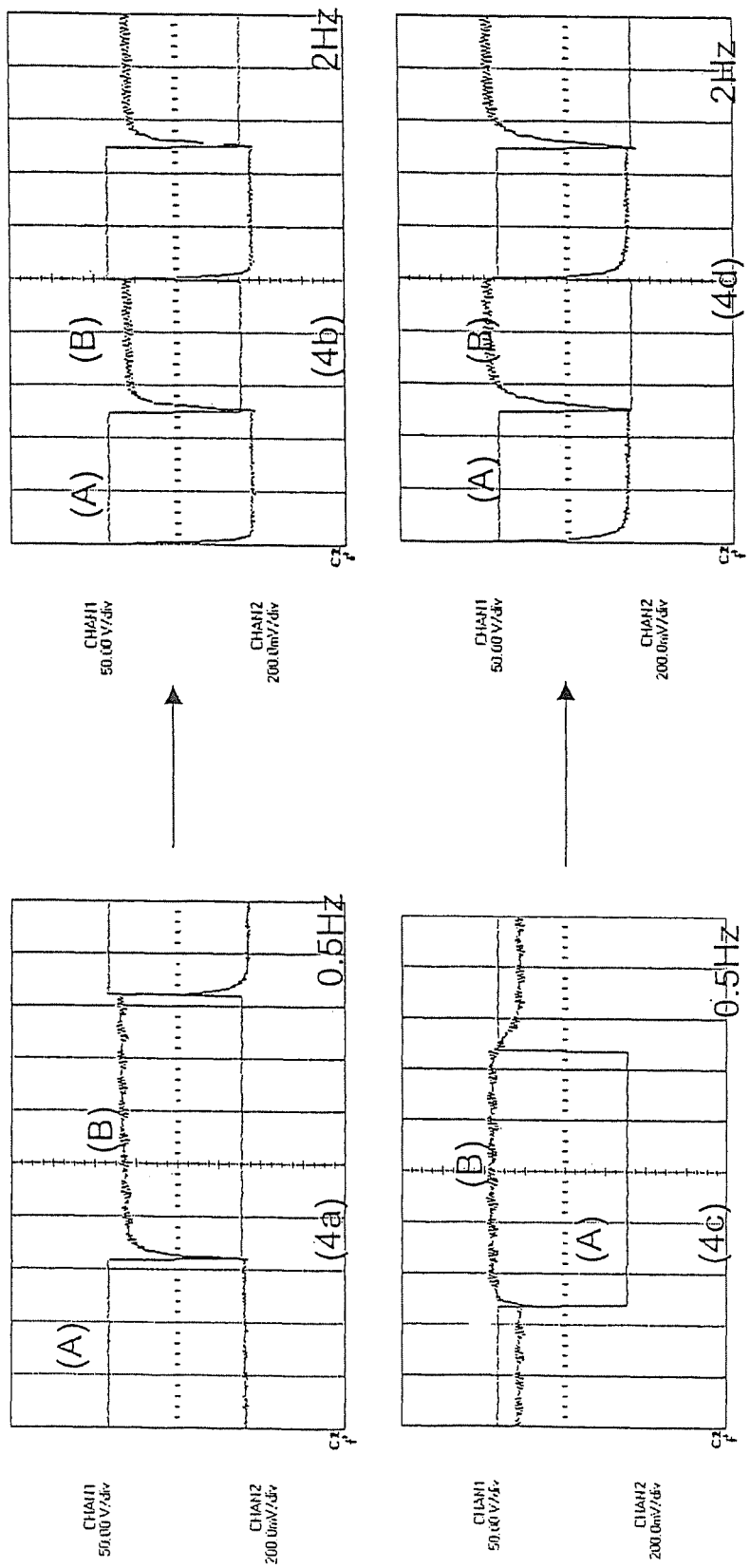
FIG. 4a show the effect of switching frequency on the electro-optical response of the display of Examples 6 and 7 measured at ±80V; 4a and 4b for the Comparative Example 6 measured at 0.5 Hz and 2 Hz, respectively; and 4c and 4d for Example 7 measured at 0.5 Hz and 2 Hz, respectively.

The same procedure of Comparative Example 1 was followed except that an electrophoretic fluid containing 6.4 wt % of the $TiO_2$-containing microparticles (from Preparation 8) and 1.66 wt % of $CuPc-C_8F_{17}$ dye (from Preparation 6) was used. The EPD was driven at ±80V with two different frequencies, 0.5 Hz and 2 Hz. As shown in FIGS. 4a and 4b, the electro-optic response of the display is not dependent on the frequency of the electrical input pulse.

Example 7

The same procedure of Comparative Example 1 was followed except that an electrophoretic fluid containing 6.4 wt % of the $TiO_2$-containing microparticles (from Preparation 8), 1.66 wt % of CuPc-$C_8F_{17}$ dye (from Preparation 6), 0.5 wt % (based on the weight of $TiO_2$ microparticles) of $R_f$-trifluoromethylamide 2000 (from Preparation 3) and 10 wt % of co-solvent ZT180 (from Solvay Solexis) was used.

As shown in FIGS. 4c and 4d, a frequency-dependent electro-optical response at an operation voltage of ±80V was observed. The signal of electro-optical response of the display driven at 0.5 Hz (FIG. 4c) was significantly weaker than that of the display driven at 2 Hz (FIG. 4d). This shows that the cross-bias and/or crosstalk effects of a passive matrix EPD may also be suppressed by adjusting the driving frequency.

Examples 8-11

Improvement of Threshold Voltage by $R_f$-trifluoromethylamide 2000 in the Presence of Co-solvent and/or SiPc Dye

Example 8

Comparative Example

The same procedure of Comparative Example 1 was followed except that an electrophoretic fluid containing 9.7 wt % of the $TiO_2$-containing microparticles (from Preparation 8) and 1.24 wt % of CuPc-$C_8F_{17}$ dye (from Preparation 6) was used.

Example 9

The same procedure of Comparative Example 1 was followed except that an electrophoretic fluid containing 9.7 wt % of the $TiO_2$-containing microparticles (from Preparation 8), 1.24 wt % of CuPC-$C_8F_{17}$ dye (from Preparation 6), 1 wt % (based on the weight of $TiO_2$-containing microparticles) of $R_f$-trifluoromethylamide 2000 (from Preparation 3) and 10 wt % of co-solvent ZT180 (from Solvay Solexis) was used.

Example 10

The same procedure of Comparative Example 1 was followed except that an electrophoretic fluid containing 6.4 wt % of the $TiO_2$-containing microparticles (from Preparation 8), 1.66 wt % of CuPc-$C_8F_{17}$ dye (from Preparation 6), 2 wt % (based on the weight of $TiO_2$-containing microparticles) of $R_f$-trifluoromethylamide 2000 (from Preparation 3) and 10 wt % of co-solvent ZT180 (from Solvay Solexis) was used.

Example 11

The same procedure of Comparative Example 1 was followed except that an electrophoretic fluid containing 9.7 wt % of the $TiO_2$-containing microparticles (from Preparation 8), 0.6 wt % of CuPc-$C_8F_{17}$ dye (from Preparation 6), 0.5 wt % of SiPc-$C_8F_{17}$ dye (from Preparation 7), 1 wt % (based on the weight of $TiO_2$-containing microparticles) of $R_f$-trifluoromethylamide 2000 (from Preparation 3) and 10 wt % of co-solvent ZT180 (from Solvay Solexis) was used.

Figure 5:
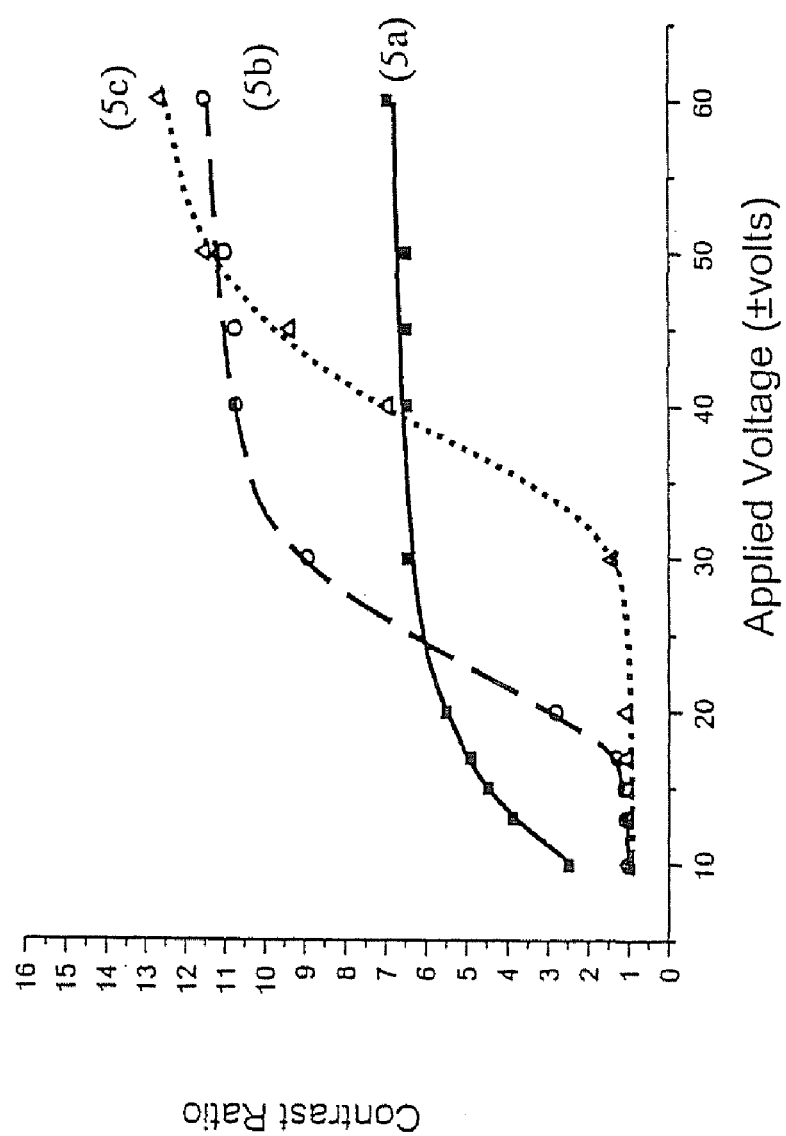
FIG. 5 shows the contrast ratio vs. driving voltage curves of the displays of Comparative Example 8 (Curve a), Example 9 (Curve b), and Example 10 (Curve c).

The EPD displays of Comparative Example 8 and Examples 9-10 were driven at 0.2 Hz electrical pulsing waveform with different driving voltages sweeping from ±10V to ±60V. The contrast ratios (calculated from the Dmax and Dmin measured by GretagMacBeth™ Spectrolino Spectrometer using a square electrical waveform) of the display versus different driving voltages are shown in FIG. 5. As shown in the Curve (5a), no threshold voltage phenomenon (with contrast ratio well above 1 at ±10V) was observed for the EPD of Comparative Example 8.

Also shown in the Curves (5b) and (5c) of FIG. 5 for the displays of Examples 9 and 10, respectively, the addition of $R_f$-trifluoromethylamide 2000 to the electrophoretic fluid significantly enhanced the threshold voltage and gamma of the contrast ratio vs. voltage characteristic curve. Threshold voltages of about 15V and 30V were obtained for the displays of Examples 9 and 10, respectively. A dramatic increase in contrast ratio was also observed in Examples 9 and 10.

Figure 6:
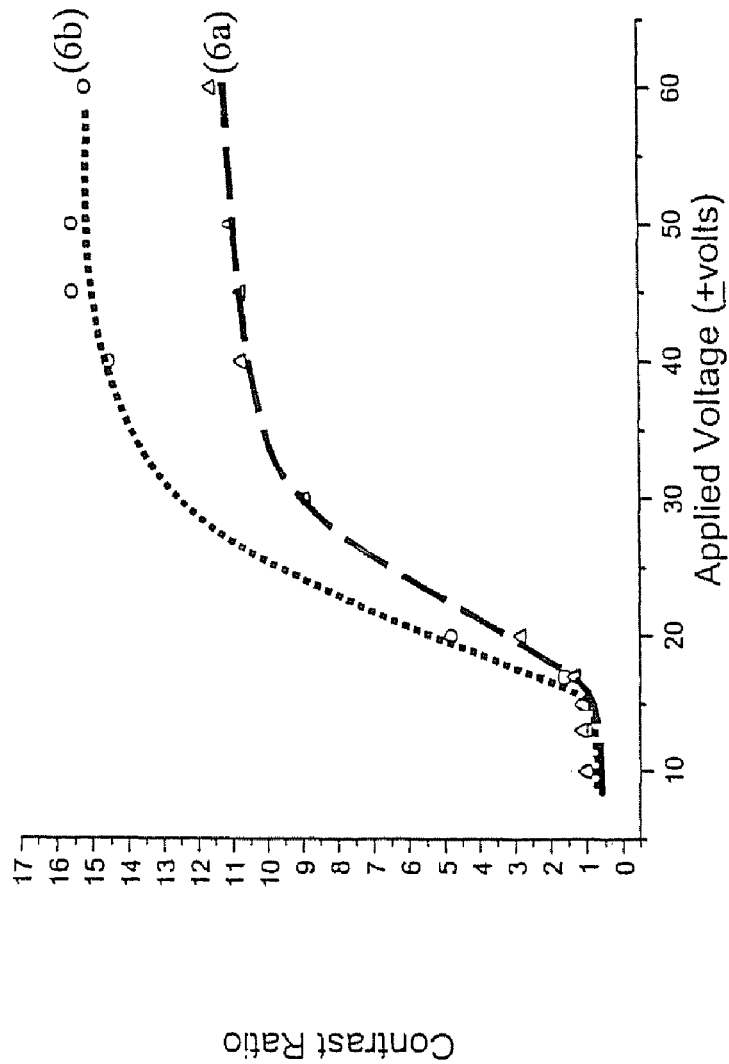
FIG. 6 shows the contrast ratio vs. driving voltage curves for the displays of Example 9 (Curve a) and Example 11 (Curve b).

The contrast ratio and gamma of the display of Example 9 (Curve 6a in FIG. 6) can be further improved significantly with the threshold voltage maintained essentially at the same level (about 15 V) by replacing the 1.24 wt % of CuPc-$C_8F_{17}$ dye with a dye mixture containing 0.5 wt % SiPc-$C_8F_{17}$ and 0.6 wt % of the CuPc-$C8F_{17}$ (Example 11, Curve 6b in FIG. 6). The concentrations of the two dyes of Example 11 were selected to match the optical density of the 1.24 wt % of CuPc-$C_8F_{17}$ dye solution in HT200.

Figure 7:
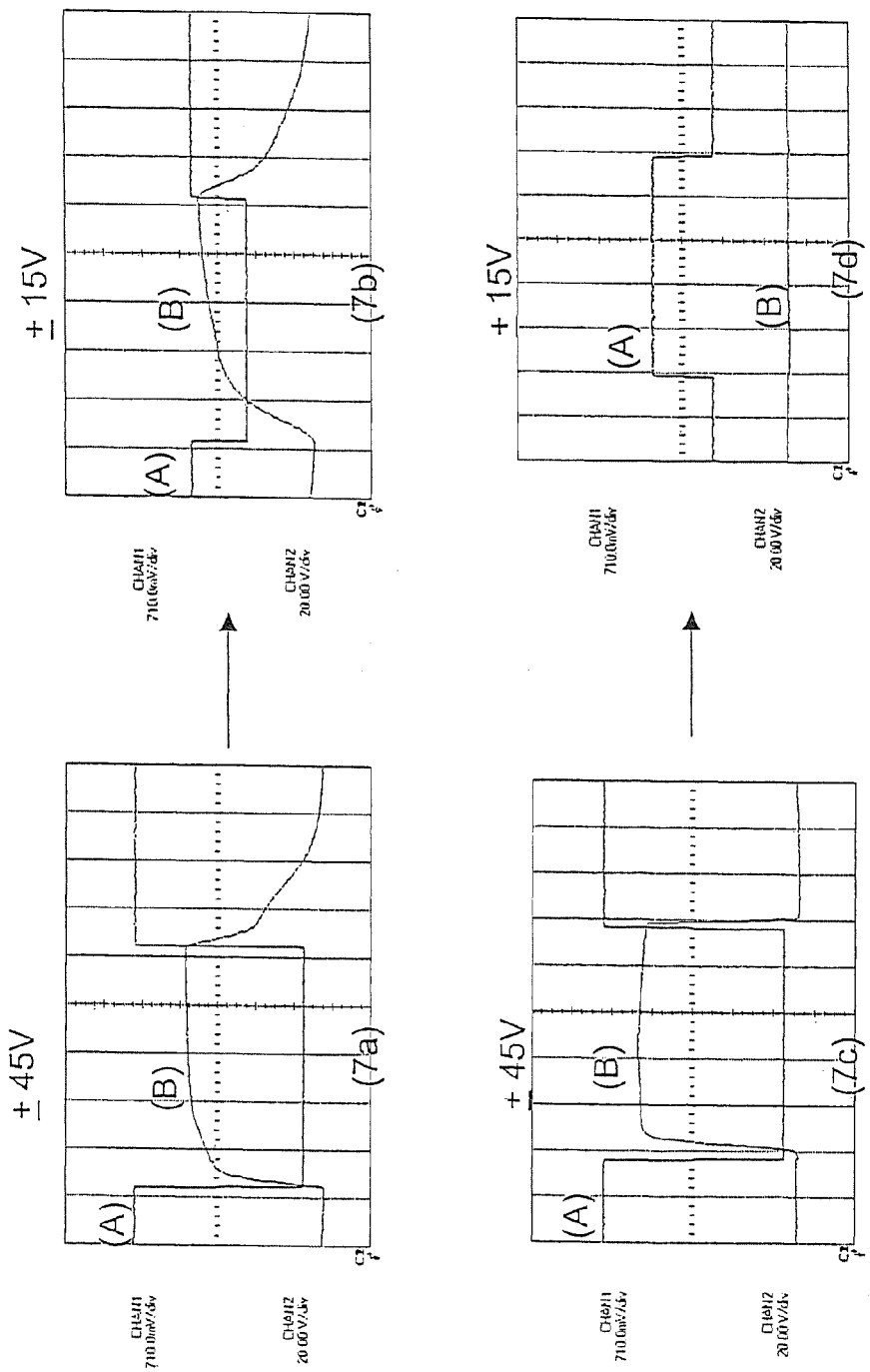
FIG. 7a show the electro-optical response of the displays of Examples 8 and 11; 7a and 7b for Comparative Example 8 measured at ±45V/0.2 Hz and ±15V/0.2 Hz, respectively; and 7c and 7d for Example 11 measured at ±45V/0.2 Hz and ±15V/0.2 Hz, respectively.

FIG. 7a and FIG. 7b show the electro-optical response of the EPD display of Comparative Example 8 measured at ±45V/0.2 Hz and ±15V/0.2 Hz, respectively. FIG. 7c and FIG. 7d show the electro-optical response of the display of Example 11 also measured at ±45V/0.2 Hz and ±15V/0.2 Hz, respectively. It is evident that the both threshold characteristics and switching performance of the display of Example 11 were greatly improved as compared to those of the Comparative Example 8.

Examples 12-14

Improvement of Threshold Characteristics by $R_f$-amine 2000 and Co-solvent

Example 12

Repeat of Comparative Example 8

The same procedure of Comparative Example 1 was followed except that an electrophoretic fluid containing 9.7 wt % of the $TiO_2$-containing microparticles (from Preparation 8), and 1.24 wt % of CuPc-$C_8F_{17}$ dye (from Preparation 6) was used.

Example 13

The same procedure of Comparative Example 1 was followed except that an electrophoretic fluid containing 9.7 wt % of the $TiO_2$-containing microparticles (from Preparation 8), 1.24 wt % of CuPc-$C_8F_{17}$ dye (from Preparation 6), 1 wt % (based on the weight of $TiO_2$-containing microparticles) of $R_f$-amine 2000 (from Preparation 1) and 10 wt % of co-solvent ZT180 (from Solvay Solexis) was used.

Example 14

The same procedure of Comparative Example 1 was followed except that an electrophoretic fluid containing 9.7 wt % of the $TiO_2$-containing microparticles (from Preparation 8), 1.24 wt % of CuPc-$C_8F_{17}$ dye (from Preparation 6), 2 wt % (based on the weight of $TiO_2$-containing microparticles) of $R_f$-amine 2000 (from Preparation 1) and 10 wt % of co-solvent ZT180 (from Solvay Solexis) was used.

Figure 8:
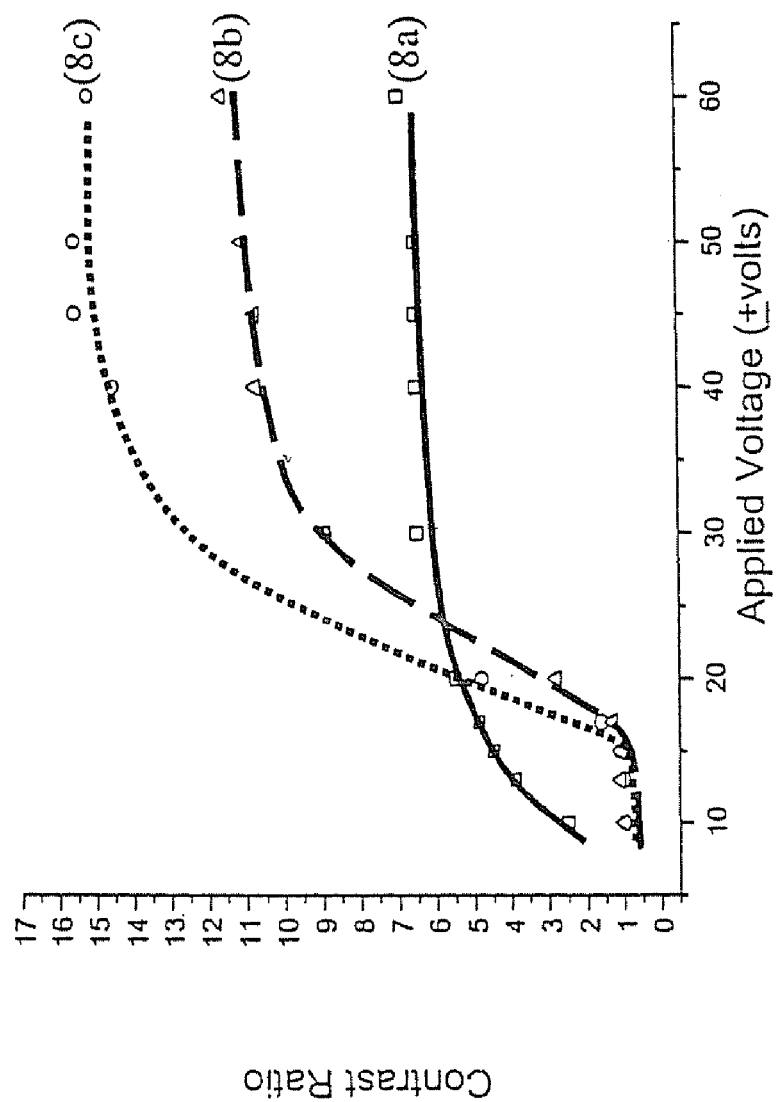
FIG. 8 shows the contrast ratio vs. driving voltage curves for the displays of Comparative Example 12 (Curve a), Example 13 (Curve b) and Example 14 (Curve c).

The contrast ratios of the displays of Examples 12-14 as a function of driving voltage at 0.2 Hz are shown in FIG. 8. The display of the Comparative Example 12 shows a low contrast ratio with no observable threshold characteristics (Curve 8a). The addition of 1 wt % (Curve 8b, Example 13) and 2 wt % (Curve 8c, Example 14) of $R_f$-amine 2000 based on the weight of $TiO_2$-containing microparticles significantly improves the contrast ratio and threshold characteristics. A threshold voltage of about 15V as well as a sharp gamma were obtained. No deterioration of switching rate was observed.

Example 15-17

Improvement of Threshold Voltage by F8C1 and FNC1

Example 15

Comparative Example

The same procedure of Comparative Example 1 was followed except that an electrophoretic fluid containing 6 wt % of the $TiO_2$-containing microparticles (from Preparation 9) and 1.36 wt % of $CuPc-C_8F_{17}$ dye (from Preparation 6) was used.

Figure 9:
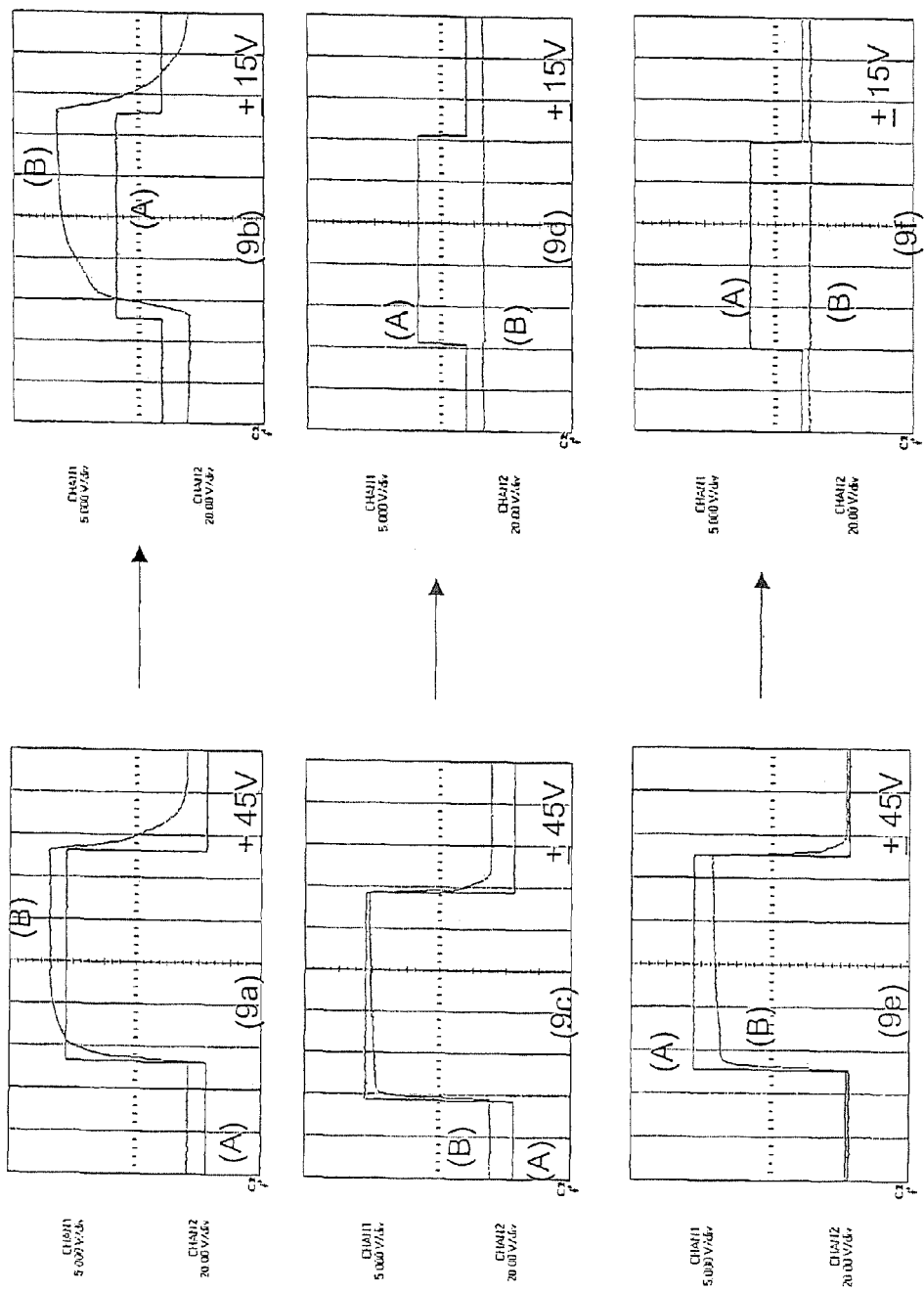
FIG. 9a show the electro-optic response of the displays of Examples 15-17; 9a and 9b for Comparative Example 15 measured at ±45V/0.2 Hz and ±15V/0.2 Hz, respectively; 9c and 9d for Example 16 measured at ±45V/0.2 Hz and ±15V/0.2 Hz, respectively; and 9e and 9f for Example 17 measured at ±45V/0.2 Hz and ±15V/0.2 Hz, respectively.

As shown in FIGS. 9a and 9b, strong electro-optical responses were observed at both ±45V/0.2 Hz and ±15V/0.2 Hz operation conditions. No threshold was observed.

Example 16

The same procedure of Comparative Example 1 was followed except that an electrophoretic fluid containing 6 wt % of the $TiO_2$-containing microparticles (from Preparation 9), 1.36 wt % of $CuPc-C_8F_{17}$ dye (from Preparation 6) and 3.3 wt % (based on the total weight of $TiO_2$-containing microparticles) of F8C1 (from Preparation 4) was used.

As shown in FIGS. 9c and 9d, a strong electro-optical response was observed at ±45V/0.2 Hz (FIG. 9c), but no response was observed at all at ±15V/0.2 Hz (FIG. 9d).

Example 17

The same procedure of Comparative Example 1 was followed except that an electrophoretic fluid containing 6 wt % of the $TiO_2$-containing microparticles (from Preparation 9), 1.36 wt % of $CuPc-C_8F_{17}$ dye (from Preparation 6), and 1.6 wt % (based on the total weight of $TiO_2$-containing microparticles) of FNC1 (from Preparation 5) was used.

As shown in FIG. 9e and 9f, a strong electro-optic response at ±45V/0.2 Hz was observed (FIG. 9e), but no response was observed at all at ±15V/0.2 Hz (FIG. 9f).

It is evident that all the threshold promoters of this invention are effective in significantly improving the display threshold characteristics for passive matrix applications even when the electrode conductor is not in direct contact with the electrophoretic fluid.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, materials, compositions, processes, process step or steps, to the objective, spirit and scope of the present invention. All such modifications are intended to be within the scope of the claims appended hereto.

What is claimed is:

1. A method for inducing or enhancing the threshold voltage of an electrophoretic display, which method comprises adding a threshold promoter into an electrophoretic fluid which comprises charged pigment particles or pigment-containing microparticles dispersed in a fluorinated dielectric solvent or solvent mixture, wherein said threshold promoter is represented by one of the following formulas:

$$R-[Q-L-X-Q'-(L'-Y)_m]_q \quad (T-2)$$

$$R-[Q-L-(X-Q'-L'-Y)_m]_q \quad (T-3)$$

$$[(X)_m-L-Q]_q-R-[Q'-L'-(Y)_{m'}]_{q'} \quad (T-4)$$

wherein:

m and m' are independently natural numbers which are $\geq 1$;

q and q' are independently natural numbers which are $\geq 1$;

R is a halogenated group, a halogenated polymeric chain, or a halogenated oligomeric chain;

Q and L or Q' and L' together forming a linking chain; and

X and Y are independently functional groups capable of forming hydrogen bonding, acid-base interaction, donor-acceptor interaction, metal-ligand interaction or Coulombic interaction.

2. The method of claim 1 wherein Q in -Q-L- or Q' in -Q'-L'- is independently absent, —O—, —S—, —CON<, —CONR$^{12}$—, —R$^{12}$NCO—, —CO)$_2$N—, —R$^{12}$NCONR$^{13}$—, —R$^{12}$NCSNR$^{13}$—, —OCONR$^{12}$—, —R$^{12}$NCOO—, —OCSNR$^{12}$—, —R$^{12}$NCSO—, —COO—, —OOC—, —OC(O)O—, =N— or —NR$^{12}$—, wherein R$^{12}$ and R$^{13}$ are independently hydrogen, alkyl, aryl, alkylaryl, polyether or a derivative thereof.

3. The method of claim 1 wherein m and m' are independently 1 or 2.

4. The method of claim 1 wherein q and q' are independently 1 or 2.

5. The method of claim 1 wherein X and Y are independently —OH, —SH, —NH$_2$, —NH—, =N—, >N$^+$<, =N$^+$<, —CO—, —COO—, —OCO—, —COO$^-$, —COOH, —COOCO—, —O—, —CONR$^8$—, —CONH$_2$, —OCONR$^8$—, —NR$^8$COR$^9$, —R$^8$NCONR$^9$—, —CONR$^8$CO—, —OCOO—, —SO—, —SO$_2$—, —SO$_2$—, —SO$_3$—, —SO$_4$—, —SO$_2$H, —SO$_3$H, —PO$_4$H$_2$, —PO$_4$$^{-2}$, —PO$_4$H$^-$, —PO$_3$H$_2$, —PO$_3$H$^-$, —SO$_2$NH—, —SO$_2$NR$^8$—, a pyridinium or quaternary ammonium salt, metal or metal ion or a chelated derivative thereof, wherein R$^8$ and R$^9$ are independently hydrogen, alkyl or fluorinated alkyl of 1 to 30 carbon atoms.

6. The method of claim 5 wherein X or Y is a pyridinium salt formed with a counter ion selected from the group consisting of F$^-$, Cl$^-$, Br$^-$, I$^-$, NO$_3$$^-$, NO$_2$$^-$, CO$_3$$^=$, SO$_3$$^=$, SO$_4$$^=$, PO$_3$$^=$, PO$_4$$^{3-}$, MnO$_4$$^-$, Cr$_2$O$_7$$^=$, CrO$_3$$^=$, BF$_4$$^-$, PF$_6$$^-$, AsF$_6$$^-$, SbF$_6$$^-$, optionally fluorinated aliphatic carboxylates or sulfonates, anions of optionally fluorinated sulfonyl imides, anions of optionally fluorinated aromatic carboxylates or sulfonates and fluoropolyether substituted carboxylates or sulfonates.

7. The method of claim 6 wherein said optionally fluorinated aliphatic sulfonate is $C_aH_bF_{(2a+1-b)}SO_3^-$ wherein a is 1-30 and b is 0-61.

8. The method of claim 6 wherein said optionally fluorinated aliphatic carboxylate is $C_aH_bF_{(2a+1-b)}CO_2^-$ wherein a is 1-30 and b is 0-61.

9. The method of claim 6 wherein said counter ion is $F(C_3F_6O)_dCF(CF_3)CO_2^-$, $F(C_3F_6O)_dCF_2CF_2CO_2^-$, $CF_3O$ $(C_2F_4O)_dCF_2CO_2^-$, $F(C_2F_4O)_dCF_2CO_2^-$, $F(C_3F_6O)_dCF(CF_3)SO_3^-$, $F(C_3F_6O)_dCF_2CF_2SO_3^-$, $CF_3O(C_2F_4O)_dCF_2SO_3^-$ or $F(C_2F_4O)_dCF_2SO_3^-$ wherein d is 1-20.

10. The method of claim 5 wherein said pyridinium salt is formed with an anion of $F(C_3F_6O)_dCF(CF_3)CO_2^-$ wherein d is 1-20.

11. The method of claim 1 wherein R is fluorinated alkyl or fluorinated aryl.

12. The method of claim 1 wherein R is a halogenated polymeric chain or a halogenated oligomeric chain represented by the following formula:

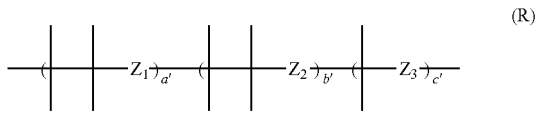

(R)

wherein the open and not designated substituent positions on the main chain are independently selected from the group consisting of hydrogen, halogen, alkyl, alkenyl, aryl, alkylaryl, fluoroalkyl, fluoroalkenyl, fluoroaryl, fluoroalkylaryl, $-OR^{10}$, $OCOR^{10}$, $-COOR^{10}$, $-CONR^{10}R^{11}$, in which $R^{10}$ and $R^{11}$ are independently hydrogen, alkyl, aryl, alkylaryl, fluoroalkyl, fluoroaryl, fluoroalkylaryl or fluorinated polyether and substituted derivatives thereof, such that R is a halogenated polymeric chain or a halogenated oligomeric chain;

$Z_1$, $Z_2$, and $Z_3$ are independently oxygen or absent; and a', b' and c' are the weight fractions of the corresponding repeating units and are independently in the range of 0-1 with their sum no greater than 1.

13. The method of claim 12 wherein the open substituent positions are fluorine or fluorinated alkyl.

14. The method of claim 1 wherein said threshold promoter is represented by Formula T-2:
wherein
Q and Q' are independently absent, $-CON<$, $-CONR^{12}-$,
$-R^{12}NCO-$, $-R^{12}NCONR^{13}-$, $-OCONR^{12}-$ or $-R^{12}NCOO-$;
L and L' are independently a straight or branched alkylene, alkylphenylene, fluorinated alkylene or fluorinated alkylphenylene chain, optionally interrupted by one or more heteroatoms;

X is a pyridinium ion;
Y is $-OH$ or amino;
m is 1 or 2; and
q is 1 or 2.

15. The method of claim 14 wherein R is a fluorinated alkyl.

16. The method of claim 14 wherein R is a fluoropolyether.

17. The method of claim 14 wherein R is a polymeric or oligomeric chain of Formula (R).

18. The method of claim 17 wherein the open substituent positions on the main chain of Formula (R) are fluorine or fluorinated alkyl.

19. The method of claim 14 wherein L and L' are independently a straight or branched alkylene chain optionally interrupted by one or more nitrogen atoms.

20. The method of claim 14 wherein Y is $-OH$.

21. The method of claim 1 wherein said threshold promoter is a pyiridium salt.

22. The method of claim 21 wherein said pyridinium salt has a counter ion selected from the group consisting of $C_aF_{2a+1}SO_3^-$, $F(C_3F_6O)_dCF(CF_3)CO_2-$ and $F(C_2F_4O)_dCF_2CO_2-$ in which a is 1-12 and d is 1-20.

23. The method of claim 1 wherein said threshold promoter is represented by Formula T-4:
wherein R is a fluoropolyether;
Q and Q' are independently absent, $-CON<$, $-CONR^{12}-$,
$-R^{12}NCO-$, $-R^{12}NCONR^{13}-$, $-OCONR^{12}-$ or $-R^{12}NCOO-$;
L and L' are independently a straight or branched alkylene, alkylphenylene, fluorinated alkylene or fluorinated alkylphenylene chain optionally interrupted by one or more heteroatoms;
X and Y are independently hydroxyl or amino;
m and m' are independently 1 or 2; and
q and q' are independently 1 or 2.

24. The method of claim 23 wherein X and Y are independently hydroxyl.

25. The method of claim 24 wherein L and L' are independently an alkylene chain optionally interrupted by one or more nitrogen atoms, m, m', q and q' are all 1.

* * * * *